June 10, 1958
H. T. KRAFT
2,838,091
TIRE BUILDING MACHINE
Filed Aug. 17, 1955
12 Sheets-Sheet 1
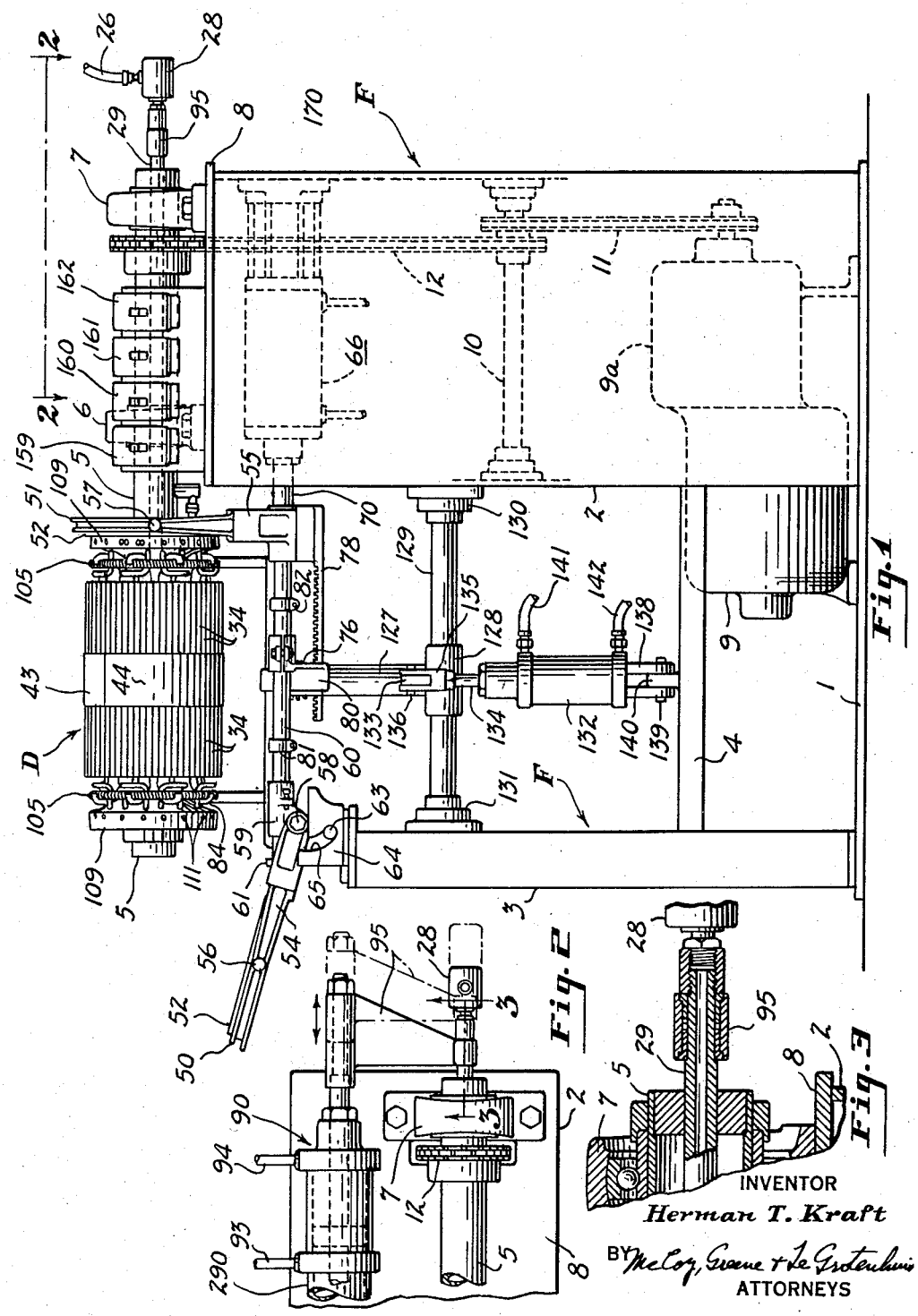
INVENTOR
*Herman T. Kraft*
BY
ATTORNEYS

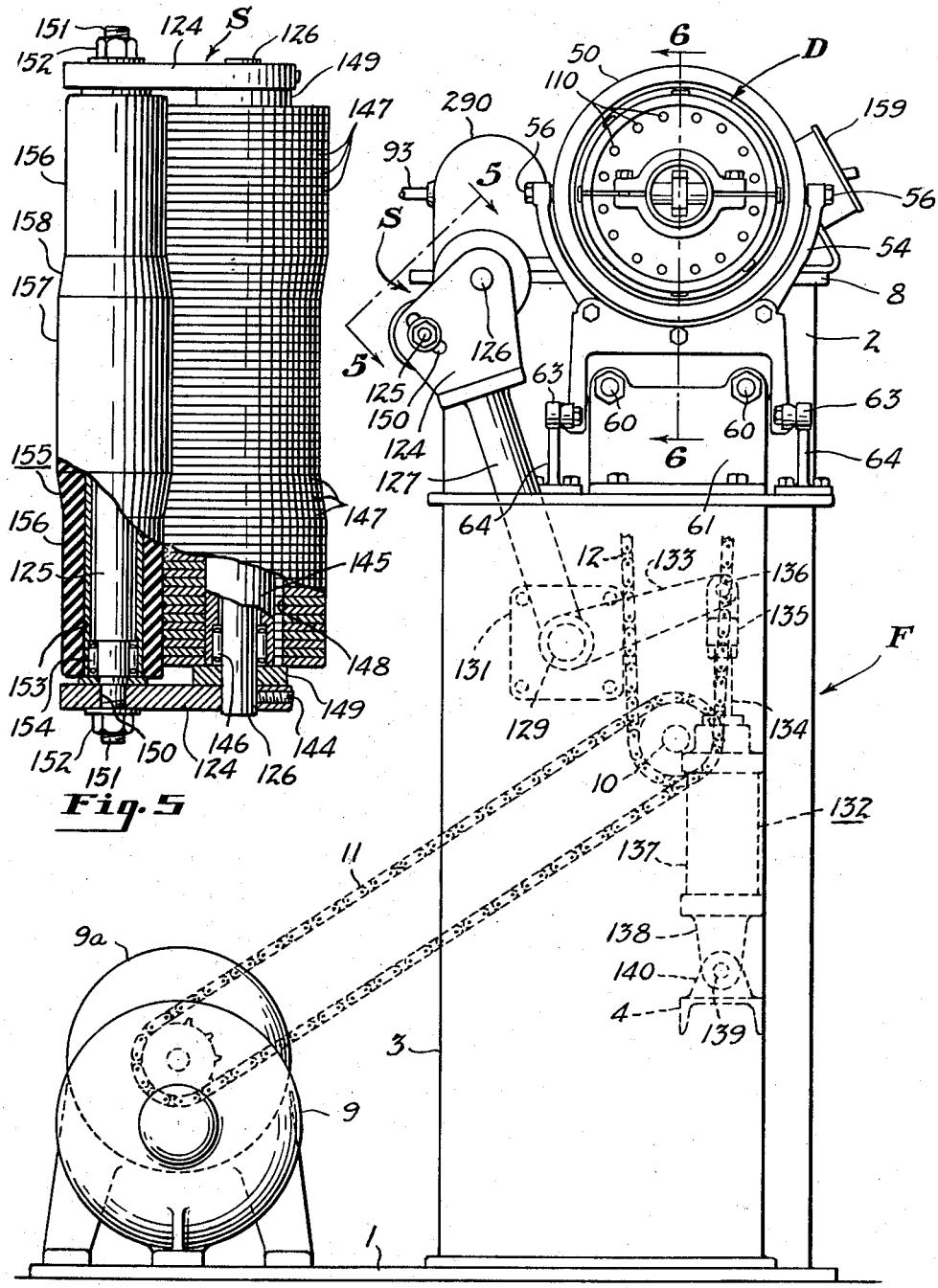

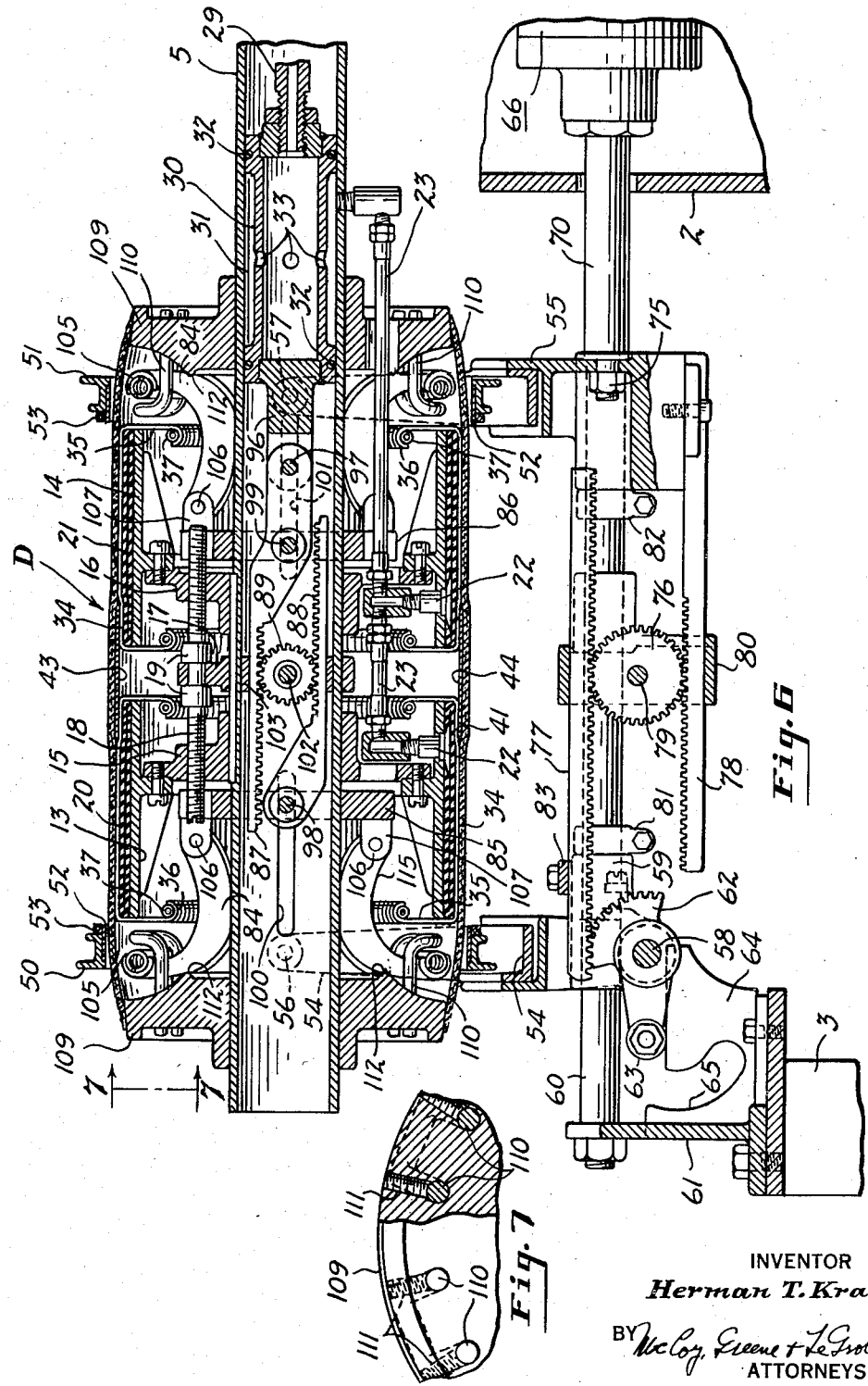

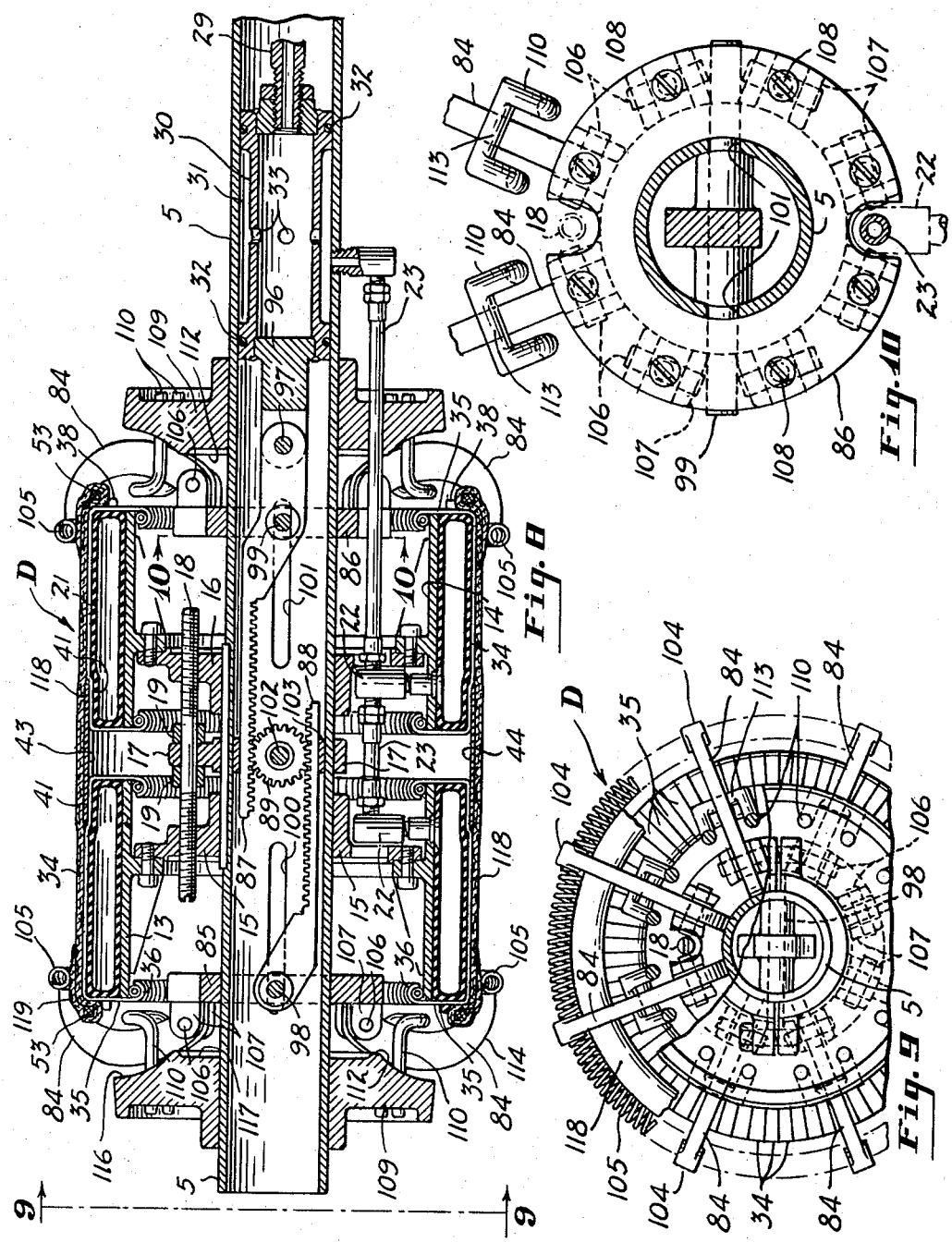

June 10, 1958     H. T. KRAFT     2,838,091
TIRE BUILDING MACHINE
Filed Aug. 17, 1955     12 Sheets-Sheet 5
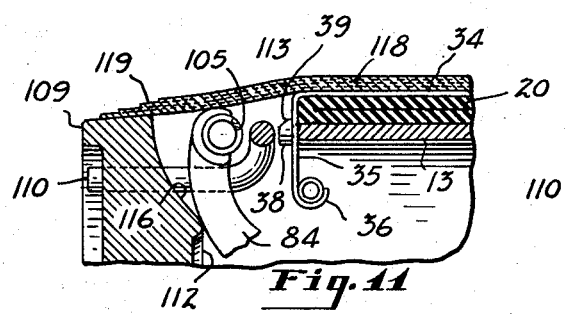
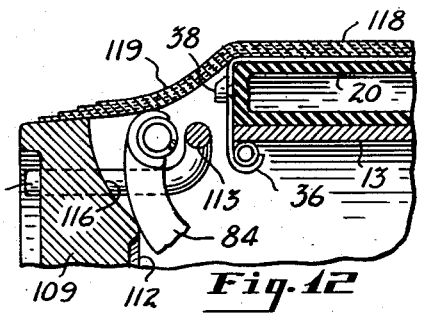
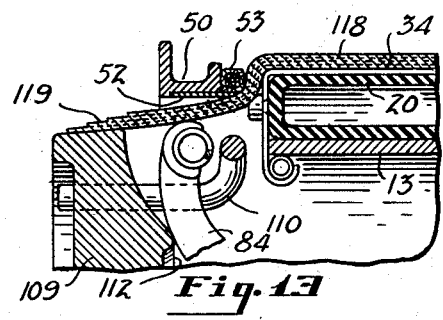
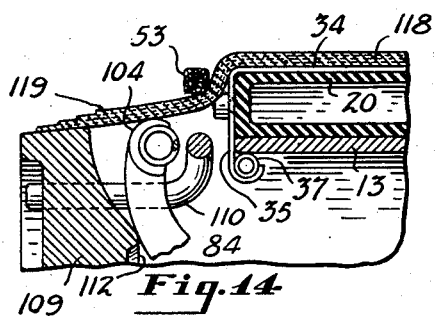
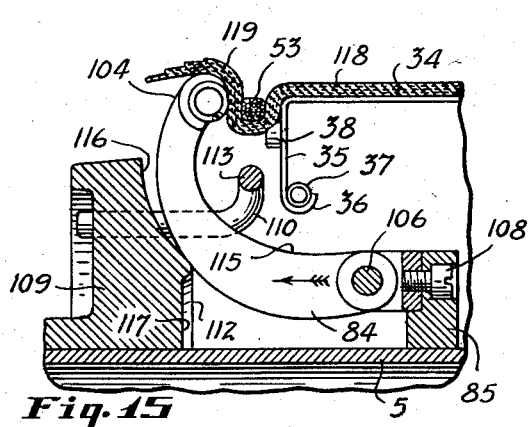
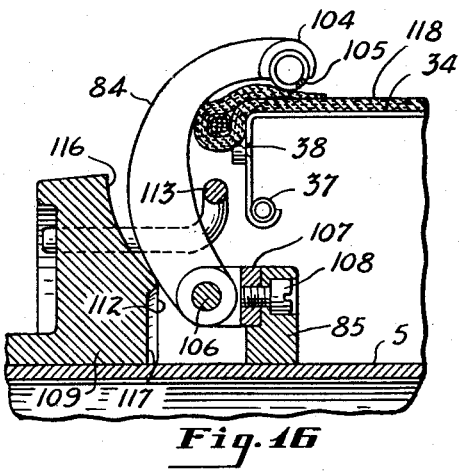
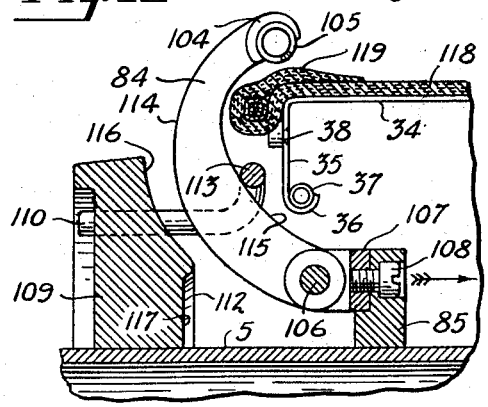
INVENTOR
*Herman T. Kraft*
BY
ATTORNEYS June 10, 1958 H. T. KRAFT 2,838,091
TIRE BUILDING MACHINE
Filed Aug. 17, 1955 12 Sheets-Sheet 6
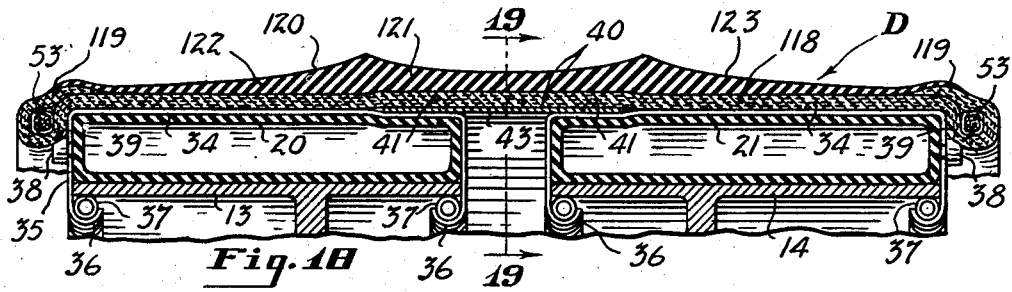
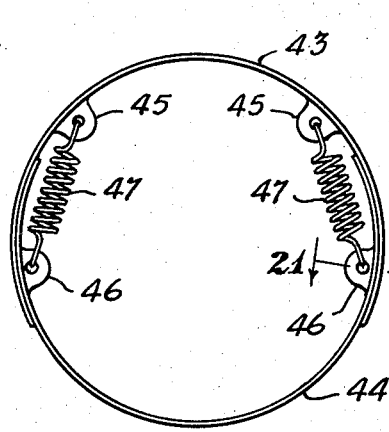
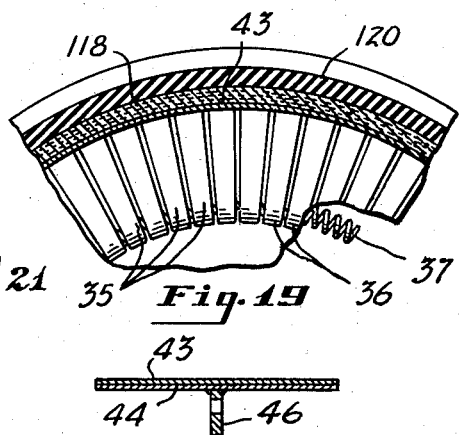
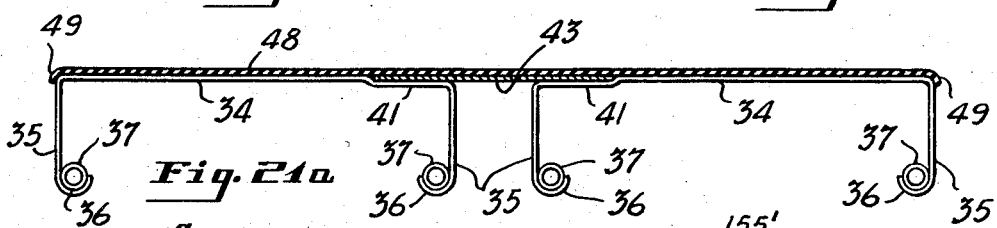
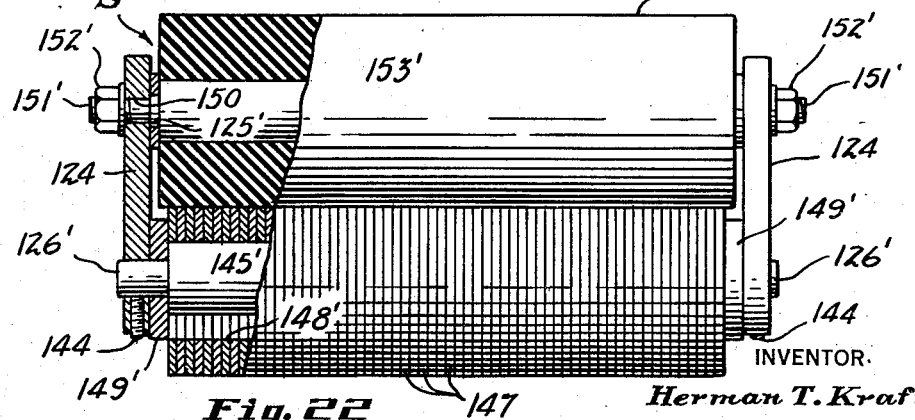
INVENTOR.
Herman T. Kraft
BY
ATTORNEYS

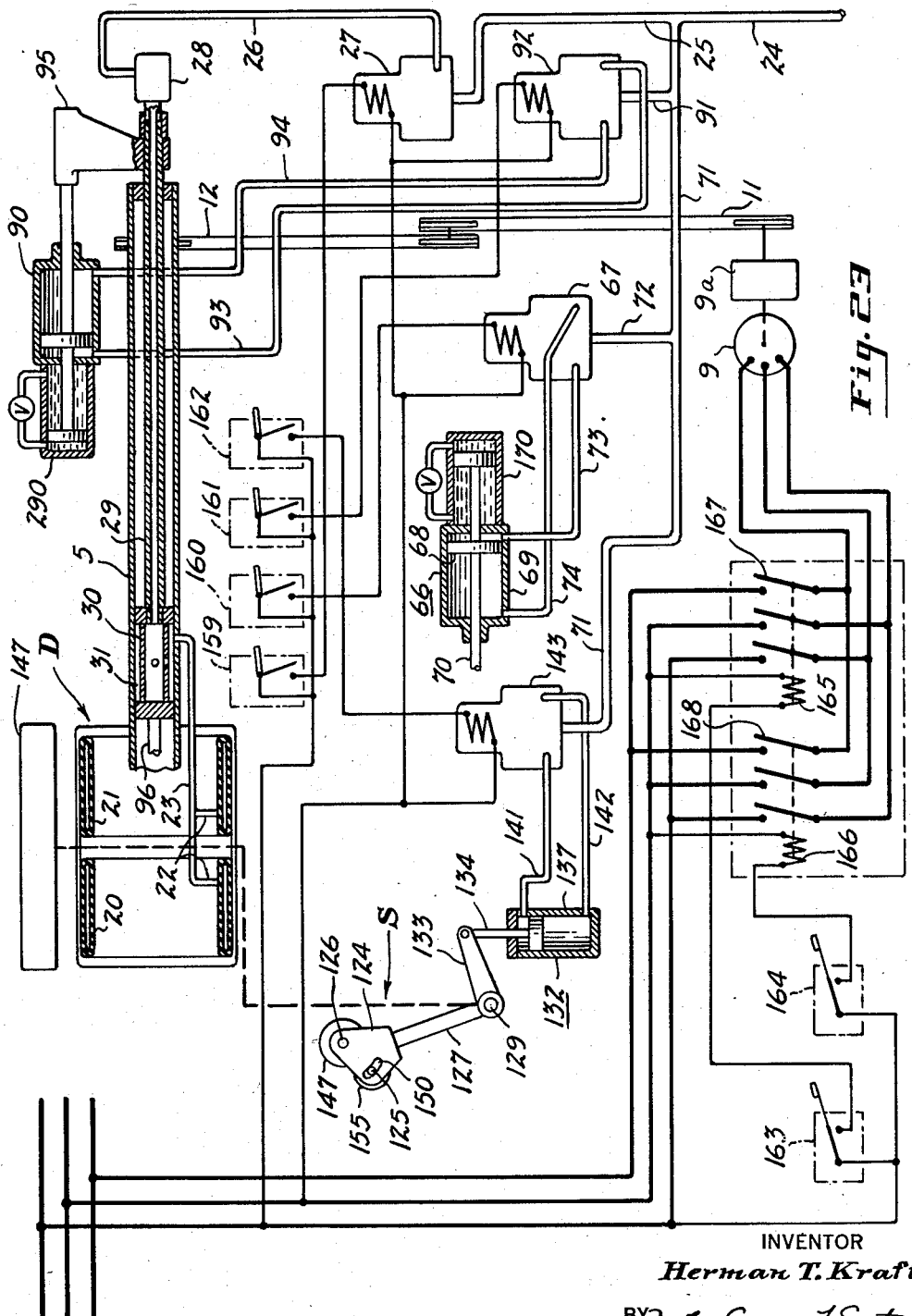

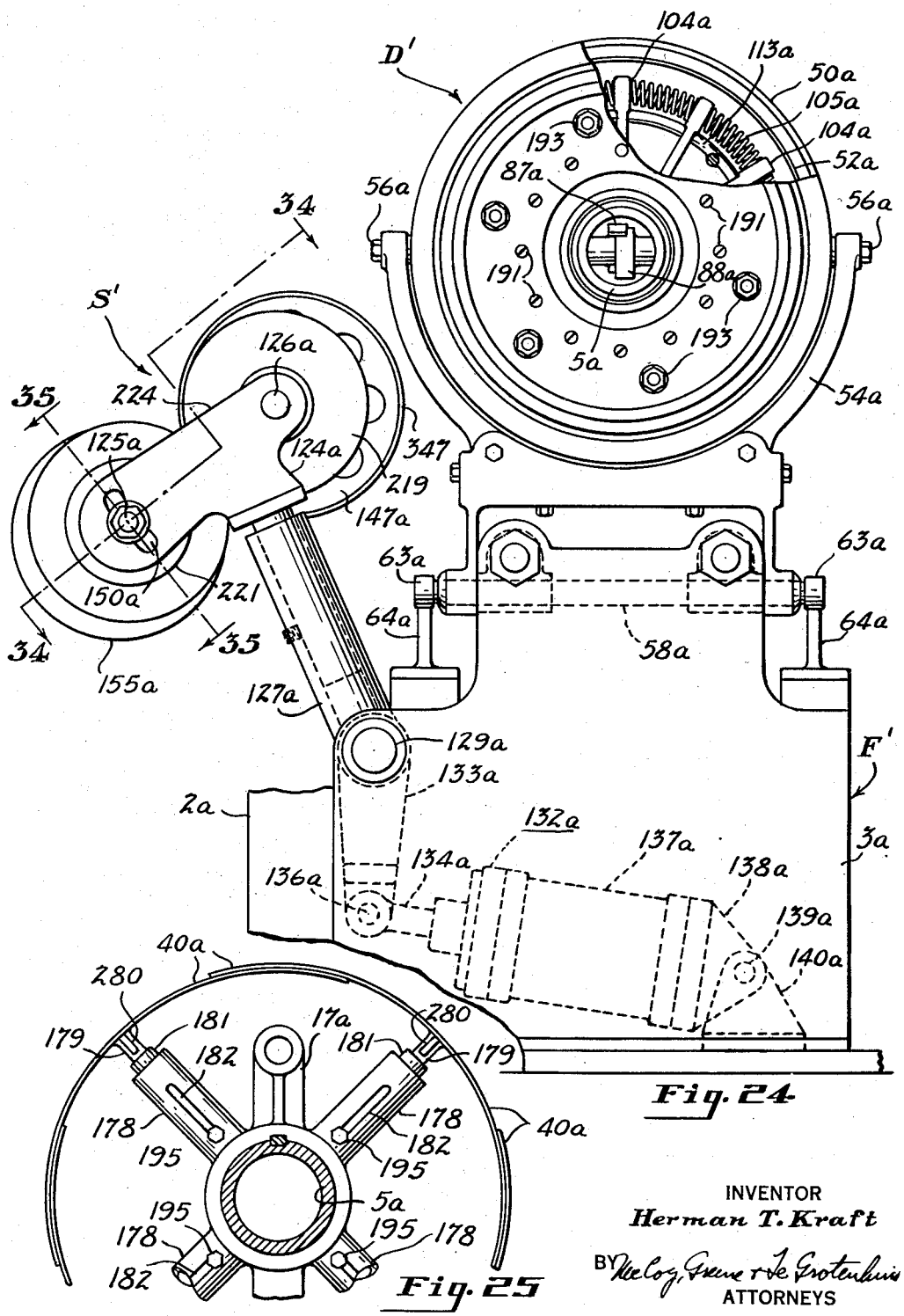

June 10, 1958
H. T. KRAFT
2,838,091
TIRE BUILDING MACHINE
Filed Aug. 17, 1955
12 Sheets-Sheet 9
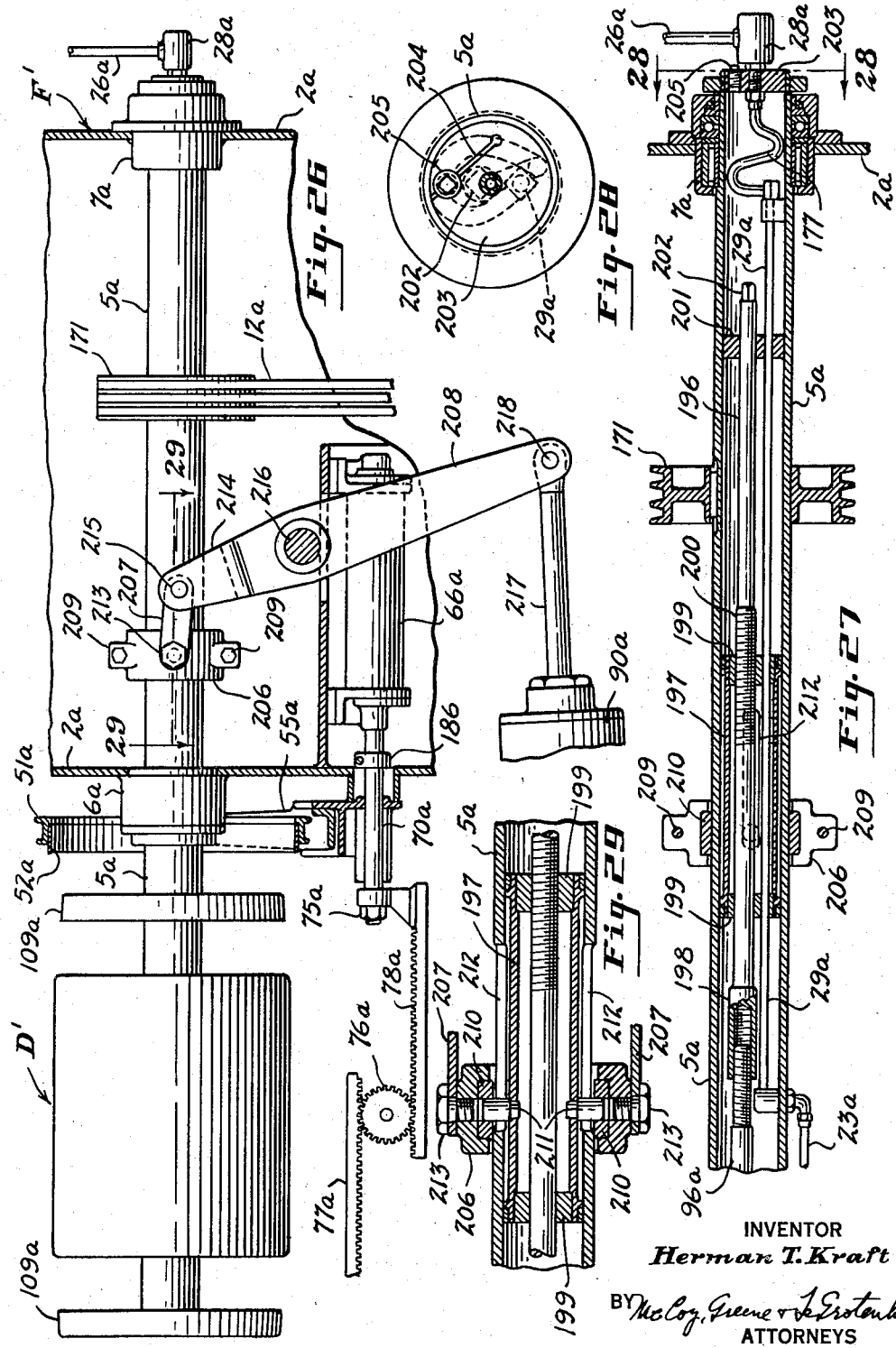
INVENTOR
*Herman T. Kraft*
BY *McCoy, Greene & tenLuis*
ATTORNEYS

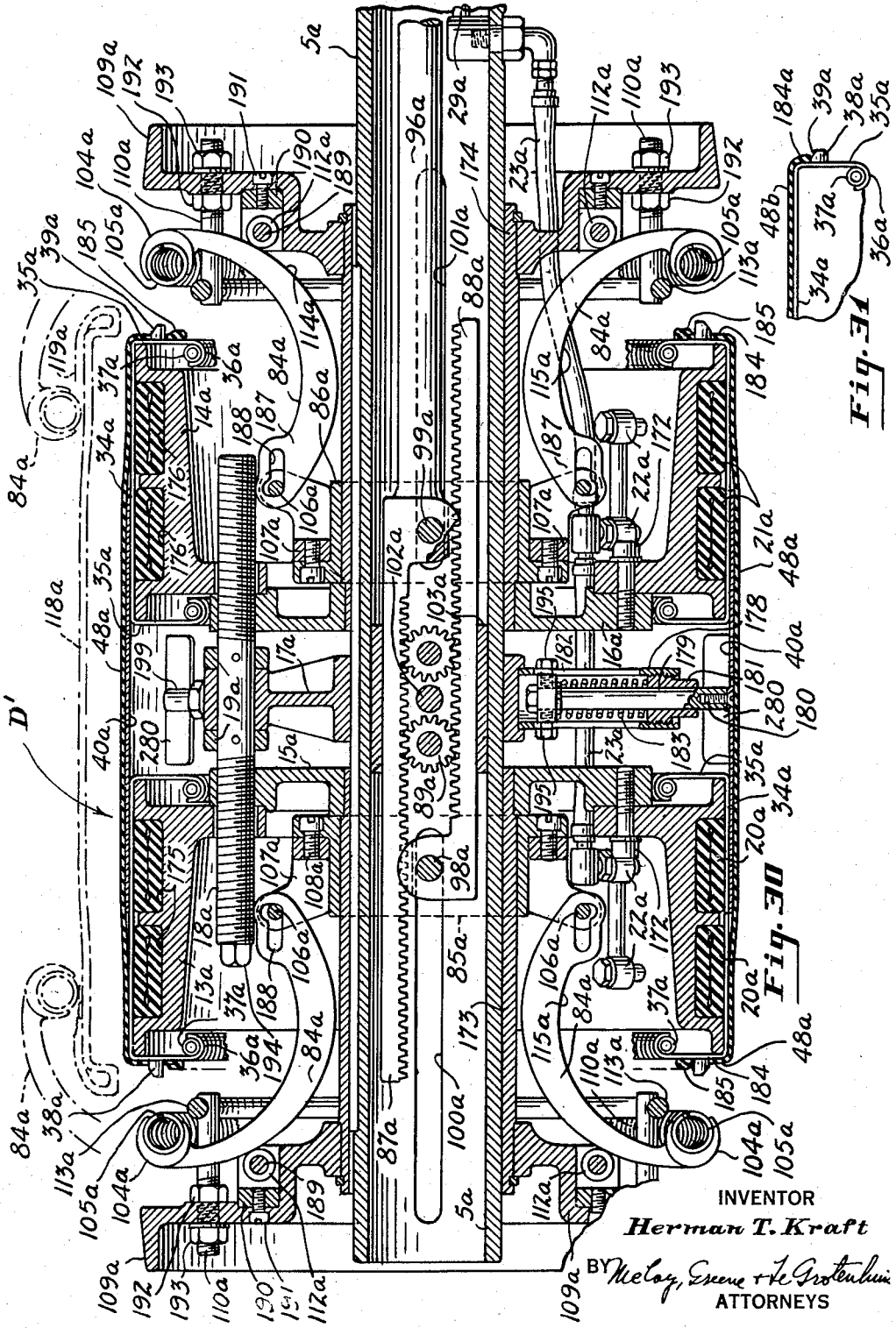

June 10, 1958     H. T. KRAFT     2,838,091
TIRE BUILDING MACHINE

Filed Aug. 17, 1955     12 Sheets-Sheet 11

INVENTOR
*Herman T. Kraft*
BY
ATTORNEYS

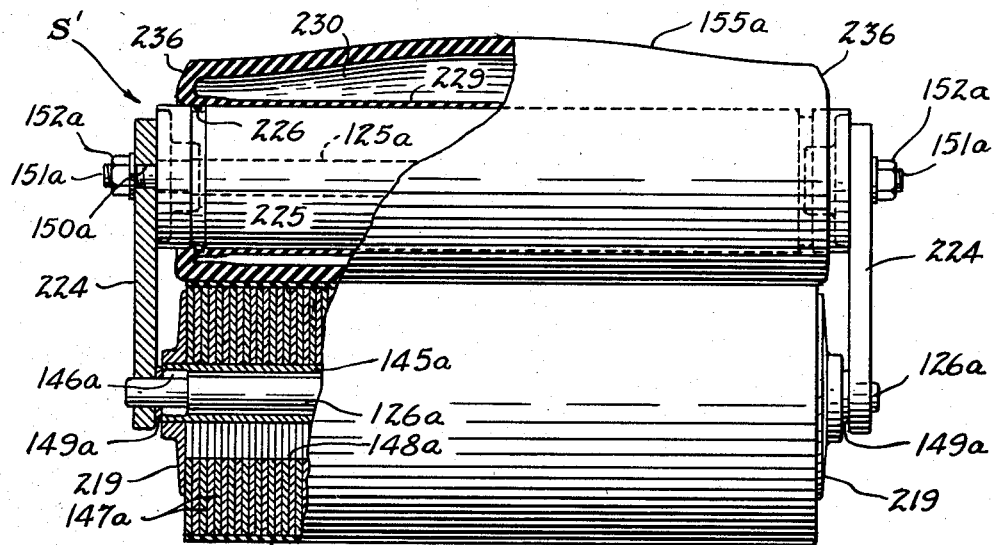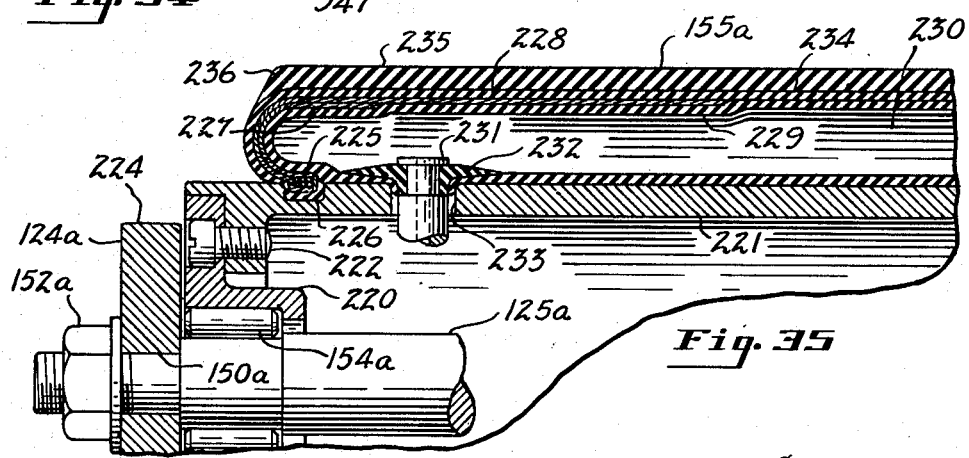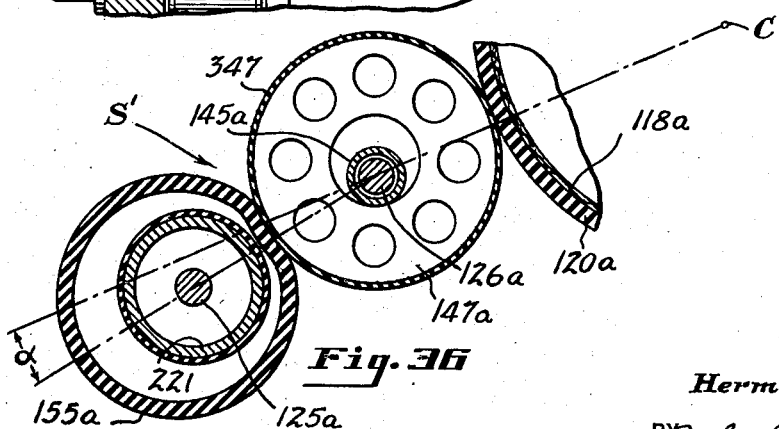

United States Patent Office 2,838,091
Patented June 10, 1958

2,838,091

TIRE BUILDING MACHINE

Herman T. Kraft, Akron, Ohio, assignor to The General Tire and Rubber Company, Akron, Ohio, a corporation of Ohio Application August 17, 1955, Serial No. 528,996

24 Claims. (Cl. 154—9)

The present invention relates to tire building machines and more particularly to a tire building machine of the expandable-drum type having improved fabric lapping and stitching means.

The tire building machine of the present invention is provided with fabric lapping means including a series of circumferentially spaced curved turn-over fingers that support a resilient constraining annulus or stitching ring, such as a garter spring or the like. The inner ends of the turn-over fingers are pivotally connected to an axially movable actuating member which moves the fingers against fulcrum members to swing the outer ends of the fingers and the stitching ring carried thereby radially outwardly and axially inwardly over the shoulders of the tire building drum. Movement of the actuating member axially outwardly causes the stitching ring to expand, to move radially outwardly and axially inwardly, and to contract around the drum so as to lap the fabric over the bead ring. Movement of the actuating member axially inwardly causes the stitching ring to move in the opposite direction out of contact with the fabric.

According to the present invention each turn-over finger is mounted between two fulcrum members and engages each of said members, the axially outer fulcrum member providing a first pivot for the finger near the inner end of the finger and the other fulcrum member providing a second pivot for the finger radially outwardly of said first pivot so that the path of movement of the stitching ring during axial inward movement of the actuating member is radially outwardly of the path of movement of said ring during axial outward movement of said actuating member. Such a construction avoids dragging of the stitching ring over the fabric as it is retracted away from the drum. Excellent results may be obtained where the pivotal connection between each turn-over finger and the actuating member includes an elongated slot and a horizontal pivot pin movable in said slot.

An object of the present invention is to provide an improved expandable tire building drum.

A further object of the invention is to provide improved means for stitching the side wall and tread portions of a tire to the fabric on a tire building drum.

A still further object of the invention is to provide a tire building machine with an improved means for lapping the end portions of the fabric over the bead rings.

Another object of the invention is to provide improved means for controlling positioning of the turn-over fingers and the annular stitching rings of a semi-automatic tire building machine.

A further object of the invention is to provide an improved method for applying the bead rings to the fabric of a tire on a tire building drum.

Other objects, uses and advantages of the present invention will become apparent to those skilled in the art from the following description and claims and from the drawings in which:

Figure 1 is a side elevational view on a reduced scale with parts broken away and parts omitted, showing a small semi-automatic tire building machine constructed according to the present invention;

Figure 2 is a fragmentary top view taken substantially on the line indicated at 2—2 in Fig. 1 and on a larger scale, the position of the parts when the piston is at one end of its stroke being shown in solid lines and the position of the parts when the piston is at the other end of its stroke being shown in dot-dash lines;

Figure 3 is a fragmentary longitudinal vertical sectional view taken substantially on the line 3—3 of Fig. 2 and on a larger scale;

Figure 4 is an end elevational view with parts omitted of the tire building machine of Fig. 1 and on a larger scale;

Figure 5 is a longitudinal view with parts omitted and with parts broken away and shown in section taken substantially on the line indicated at 5—5 in Fig. 4 and on a larger scale;

Figure 6 is a fragmentary longitudinal vertical sectional view with parts omitted taken substantially on the line indicated at 6—6 in Fig. 4 and on a larger scale;

Figure 7 is a fragmentary end elevational view with parts broken away and shown in section taken substantially on the line 7—7 of Fig. 6;

Figure 8 is a fragmentary longitudinal vertical sectional view similar to Fig. 6 and with parts omitted showing the position of the parts after the drum is expanded and the fabric is lapped over the bead rings;

Figure 9 is a fragmentary end elevational view with parts broken away taken substantially on the line indicated at 9—9 in Fig. 8 and on the same scale;

Figure 10 is a fragmentary transverse vertical sectional view with parts broken away and parts omitted taken substantially on the line 10—10 of Fig. 8 and on the same scale;

Figure 11 is a fragmentary longitudinal vertical sectional view of the tire building machine with parts omitted showing the position of the parts just after the fabric is placed on the drum;

Figure 12 is a fragmentary longitudinal vertical sectional view similar to Fig. 11 showing the position of the parts just after the drum is expanded;

Figure 13 is a fragmentary longitudinal vertical sectional view similar to Fig. 12 showing the position of the parts when the bead setting ring is moved to its axially innermost position adjacent the end of the tire building drum;

Figure 14 is a fragmentary view similar to Fig. 13 showing the position of the parts just after the bead setting rings are moved away from the drum;

Figure 15 is a fragmentary view similar to Fig. 14 and with parts omitted showing the position of the parts during radial outward movement of the stitching ring;

Figure 16 is a fragmentary view similar to Fig. 15 showing the position of the parts as the stitching ring completes turning of the fabric over the bead ring;

Figure 17 is a fragmentary view similar to Fig. 16 showing the position of the parts as the stitching ring is moved axially outwardly away from the tire building drum;

Figure 18 is a fragmentary longitudinal vertical sectional view of the tire building machine with parts omitted showing the position of the parts just after the tread and side wall portions of the tire are applied to the fabric;

Figure 19 is a fragmentary transverse vertical sectional view with parts broken away taken substantially on the line 19—19 of Fig. 18 and on the same scale;

Figure 20 is an end view showing the arcuate spanning members covering the central portion of the drum;

Figure 21 is a sectional view taken substantially on the line 21—21 of Fig. 20;

Figure 21a is a longitudinal vertical sectional view with parts omitted showing the drum of the tire building machine and a thin rubber sleeve covering the drum;

Figure 22 is a longitudinal view with parts omitted and with parts broken away and shown in section showing a modified form of tread stitching means which may be employed on the tire building machine of Figs. 1 to 21 in place of the means shown in Fig. 5;

Figure 23 is a diagrammatic view with parts broken away and with parts omitted showing in schematic form the control mechanism for the tire building machine of Figs. 1 to 21;

Figure 24 is a fragmentary end elevational view on a reduced scale with parts omitted and parts broken away showing a modified form of tire building machine according to the present invention;

Figure 25 is a fragmentary transverse vertical sectional view on a reduced scale with parts omitted showing the intermediate spider and the arcuate spanning members carried thereby;

Figure 26 is a fragmentary longitudinal vertical sectional view with parts shown schematically and with parts omitted showing on a reduced scale the tire building machine of Fig. 24;

Figure 27 is a fragmentary longitudinal vertical sectional view through the axis of the drum shaft showing details of the apparatus shown in Fig. 26;

Figure 28 is an end elevational view with parts omitted taken substantially on the line 28—28 of Fig. 27;

Figure 29 is a longitudinal horizontal sectional view taken substantially on the line 29—29 of Fig. 26 and on a larger scale;

Figure 32:
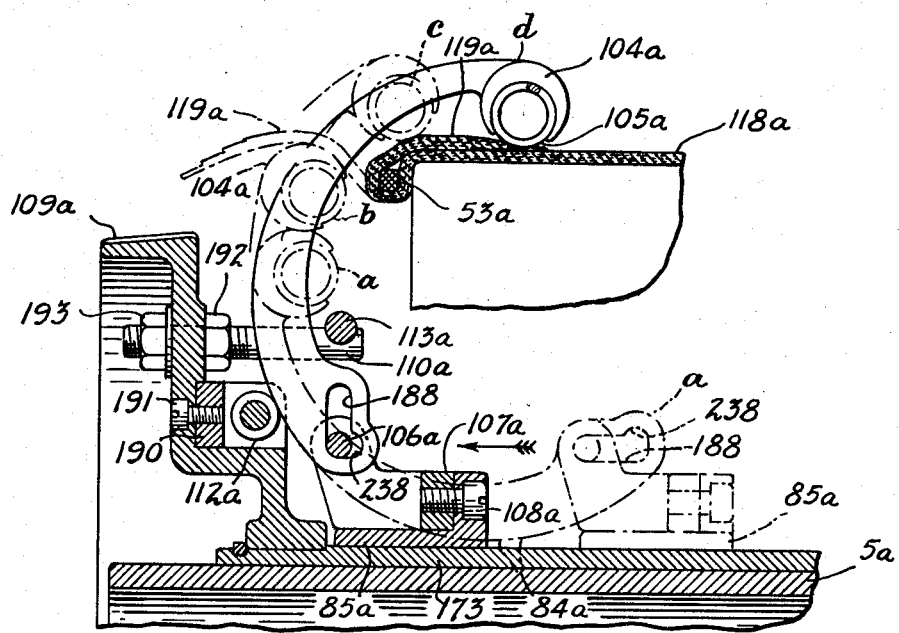
Figure 33:
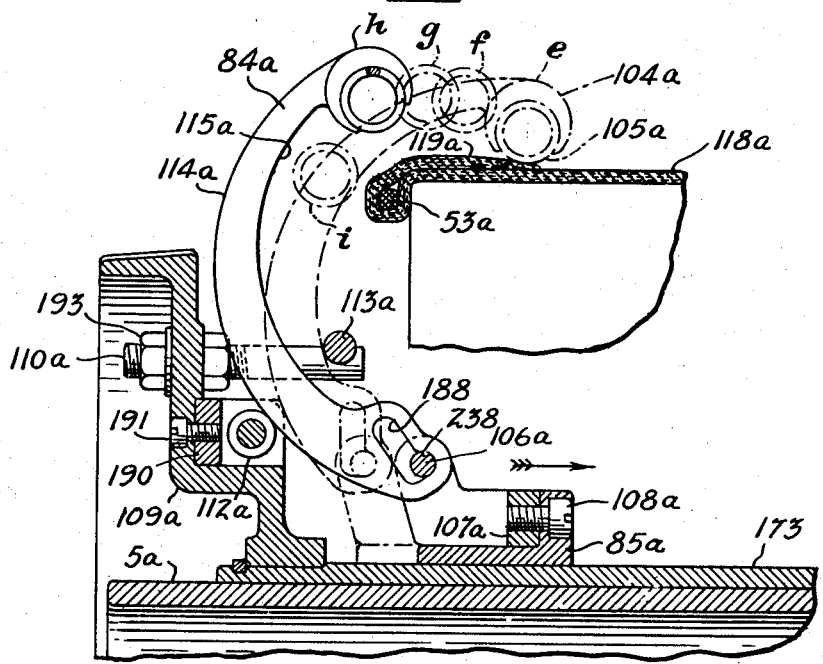

Figure 30 is a fragmentary longitudinal vertical sectional view on a reduced scale with parts broken away showing the drum of the tire building machine shown in Figs. 24 to 28, said drum being shown in solid lines in its contracted position before fabric is applied to the drum and being shown in dot-dash lines in its expanded position after the end portions of the fabric have been lapped over the bead rings;

Figure 31 is a fragmentary longitudinal vertical sectional view of the drum with a modified form of rubber cover;

Figure 32 is a fragmentary longitudinal sectional view on a reduced scale illustrating the operation of one of the turn-over fingers, the finger being shown in solid lines in its radial outer position in engagement with the stepped end portion of the fabric and being shown in dot-dash lines in its retracted position, intermediate positions of the stitching ring being shown in dot-dash lines to illustrate the path of movement of the fingers;

Figure 33 is a fragmentary longitudinal sectional view similar to Fig. 31 illustrating the movement of the finger away from the drum, the finger being shown in solid lines in its position after the stitching ring has moved axially outwardly beyond the end of the drum and being shown in dot-dash lines in its position as the stitching ring begins to move out of contact with the fabric, positions of the stitching ring being shown in dot-dash lines;

Figure 34 is a longitudinal view with parts omitted and with parts broken away and shown in section taken substantially on the line indicated at 34—34 in Fig. 24;

Figure 35 is a fragmentary longitudinal sectional view taken substantially on the line 35—35 of Fig. 24 and on a larger scale; and Figure 36 is a fragmentary transverse vertical sectional view on the same scale as Fig. 24 showing the tread stitching means with the parts thereof in their positions during stitching of the tread to the fabric on the drum.

Referring more particularly to the drawings in which like parts are referred to by the same numerals throughout the several views, Figures 1 to 19 show a semi-automatic tire building machine for making small industrial truck tires or the like. This machine is somewhat similar to the semi-automatic machine shown in my Patent No. 2,614,952, issued October 21, 1952, but is designed for smaller tires.

The small tire building machine of the present invention has a rigid metal frame F including a flat horizontal rectangular base plate 1, a vertically elongated box-like rectangular housing 2 mounted on one end portion of said base plate, a vertical standard 3 mounted at the other end of said base plate, and a horizontal channel-shaped supporting member 4 above and spaced from the base plate and extending between said housing and said standard.

A tire building rum D is mounted on the frame F above the supporting member 4 for rotation about a horizontal axis. The drum is mounted on a hollow longitudinal cylindrical cantilever shaft 5 which is journaled for rotation in a pair of longitudinally alined bearing members 6 and 7. Said bearing members are connected to the flat horizontal top plate 8 of the metal housing 2 as best shown in Fig. 1. The drum shaft is rotated in either direction by a power unit including a reversible electric motor 9 mounted on the base plate and a gear reduction unit 9a. Suitable drive means is employed for drivingly connecting the motor to the shaft including an intermediate horizontal shaft 10 rotatably mounted within the housing 2, means for rotating said intermediate shaft including a lower belt or chain 11 that is mounted on sprocket wheels carried by the motor shaft and the intermediate shaft, and means for rotating the drum shaft 5 including an upper belt or chain 12 mounted on sprocket wheels carried by the drum shaft and the intermediate shaft.

The drum D has rigid cylindrical supporting means including axially spaced generally cylindrical rigid annular metal members 13 and 14 concentric to the shaft 5 and rigid hub members or spiders 15 and 16 bolted to said members and keyed to the shaft 5 for rotation in unison therewith and adjustable axially on said shaft. An intermediate rigid member 17 is keyed to the shaft between the hub members 15 and 16 and is held against axial movement on the shaft. The member 17 has a circular opening therein to receive the central portion of a horizontal adjusting screw 18 which connects said member to the hub members 15 and 16. The screw has annular collars 19 on opposite sides of the intermediate member to prevent axial movement of the screw and is threaded at its opposite ends to fit in internally threaded openings in said hub members, whereby axial movement of said hub members is prevented. The width of the drum D may be adjusted by turning the adjusting screw 18 so as to accommodate various widths of ply material and to build different width tires.

Mounted on the rigid supporting cylinders 13 and 14 are a pair of inflatable annular pneumatic bags in the form of substantially cylindrical elastic rubber tubes 20 and 21 which have a uniform width corresponding substantially to that of the cylinders 13 and 14. Means are provided for inflating both of the pneumatic tubes simultaneously including inlet connections 22 and air conduits 23 which extend axially through the drum. Air under pressure is supplied to the conduits 23 from a pneumatic pump or other source of air under pressure through a main supply conduit 24, branch conduits 25 and 26 and a solenoid-operated air control valve 27 similar to the air supply means of said Patent No. 2,614,952. The upper end of the conduit 26 is connected to a non-rotatable pneumatic coupling 28 which supplies air to one end of a long tubular pipe 29.

The pipe 29 is mounted within and coaxial with the shaft 5 for rotation in unison therewith and for axial reciprocation relative to said shaft, the end of said pipe nearest the drum D supplying fluid under pressure to an annular sealing spool or piston member 30 that sealingly engages the internal cylindrical surface of the shaft 5 and that slides axially in said shaft. The spool 30 defines an axially elongated annular air chamber 31 intermediate its ends and has rubber O-rings 32 to prevent leakage of air from said chamber. During reciprocation of the pipe 29 and the spool 30, the chamber remains in fluid communication at all times with the conduit 23 and the pipe 29 so as to provide a fluid connection between said conduit and said pipe, a series of radial openings 33 being provided in the cylindrical intermediate portion of the spool to connect the chamber 30 to the interior of said pipe.

The drum D is preferably provided with a durable expansible metal shell means of cylindrical form to cover the pneumatic annuli 20 and 21 and the annular space between said annuli. As herein shown, such shell means includes a multiplicity of narrow sheet metal strips 34 of substantially uniform width extending axially across and disposed around the annuli 20 and 21. Each of said strips has substantially segmental end portions 35 at its opposite ends that project radially inwardly beyond the rigid rotatable cylinders 13 and 14 and substantially engage the opposite ends of said cylinders as best shown in Figs. 6 and 8. The radially inner ends of the segmental portions 35 are bent axially inwardly to form arcuate flanges or hooks 36 which support expansible and contractible annular helical garter springs 37 concentric to the cylinders 13 and 14 and radially inwardly of the end portions of said cylinders.

The garter springs bias the metal strips 34 radially inwardly to hold them against the external cylindrical surface of the annular pneumatic air bags 20 and 21 and collapse said bags when the air pressure therein is reduced by closing the valve 27. The garter springs also engage the inner cylindrical surfaces at the opposite ends of the cylinders 13 and 14 when the air bags are expanded as shown in Fig. 8 to limit the radial outward movement of the strips 34 and to position the axially extending portions of said strips so as to form an outer cylindrical metal shell concentric to said cylinders.

A series of small circumferentially spaced bead-ring-positioning lugs 38 may be rigidly connected to several of the strip end portions 35 at opposite ends of the drum D to hold the bead rings concentric to the drum. As herein shown, each lug 38 is riveted to a segmental portion 35 and has a tapered bead-engaging surface 39.

The annular spaces between the air bags 20 and 21 may be covered by a plurality of substantially coaxial arcuate members of substantially uniform axial width or other suitable spanning members, for example, as shown in the aforesaid Patent No. 2,614,952. The strips 34 have stepped portions 41 to receive the opposite end portions of the spanning members so that the outer surfaces of the spanning members are flush with those of the strips 34 whereby the drum D is externally cylindrical. As herein shown said annular space is covered by a pair of arcuate flexible sheet metal members 43 and 44 of uniform width which fit on the stepped portions 41 of the strips 34 with their external cylindrical surfaces substantially flush with the exterior surfaces of the strips. The arcuate members 43 and 44 are provided with radially inwardly projecting lugs 45 and 46 which have circular openings therein to receive the ends of a pair of helical tension springs 47.

The tension springs hold the arcuate members 43 and 44 against the metal strips 34 during expansion and contraction of the drum D and yieldably resist such expansion. The arcuate members 43 and 44 completely cover the space between the pneumatic annuli 20 and 21 and cooperate with the strips 34 to provide an expansible and contractible cylindrical metal shell for the drum D which completely covers the air bags 20 and 21. The pressure of the arcuate members 43 and 44 of the strips 34 assists in holding the strips against the air bags and tends to prevent the strips from overlapping or becoming disarranged during expansion or contraction of the drum.

If desired the drum D may be covered with a thin sheet of an extensible elastic rubber-like material. As shown in Fig. 22, the strips 34 are covered with a thin, imperforate, circumferentially continuous, elastic, rubber sheet 48 having a uniform width substantially equal to the axial length of the drum D and having thickened annular edge portions 49 at its opposite ends that engage the shoulders of the drum to prevent axial movement of the rubber sheet on the drum.

The tire building machine of the present invention is shown herein with bead placing means substantially of the type shown in my Patent No. 2,614,952 for positioning the tire bead rings over the projecting end portions of the tire fabric adjacent the drum shoulders. The bead placing means includes a pair of annular metal bead-supporting members 50 and 51 having thin cylindrical resilient flexible sheet metal strips 52 of uniform width for supporting a pair of conventional inextensible rubber-coated metal bead rings 53. The flexible strips 52 project axially inwardly from the annular bead-positioning members 50 and 51 a distance less than the axial width of the bead rings 53 so as to provide externally cylindrical surfaces for supporting said rings and for holding said rings concentric to the members 50 and 51.

The bead supporting members 50 and 51 are pivotally mounted on U-shaped metal bead-ring frames 54 and 55, respectively, by horizontally alined trunnions 56 and 57 which are held against horizontal or vertical movement relative to said frames. The left frame 54 has two lower arms keyed to a lateral shaft 58 that is journaled for rotation in an axially movable U-shaped member 59. The member 59 is mounted for axial sliding in unison on a pair of laterally alined parallel horizontal guide rods 60 of circular cross-section which are rigidly mounted under the drum D between the housing 2 and an L-shaped mounting bracket 61 carried by the standard 3. A gear segment 62 is keyed to the shaft 58 for rotation therewith between the hub portions of the member 59. A pair of laterally alined cylindrical cam rollers or followers 63 are mounted on the lower arms of the bead ring frame 54 for tilting movements about the axis of the shaft 58. A pair of laterally alined brackets 64 are mounted on the standard 3 at opposite sides of the frame 54 and are provided with laterally alined arcuate cam slots 65 of a size to receive the followers 63.

Means are provided for moving the bead positioning rings 54 and 55 toward and away from the shoulders of the drum D including hydraulically-damped pneumatic double-acting reciprocating piston motor 66 and a solenoid-operated reversing valve 67 similar to the motor and valve of the aforesaid Patent No. 2,614,952. The motor has a piston 68 that is mounted for reciprocation in a closed cylinder 69 and that is rigidly connected to a horizontal actuating rod 70. The reversible motor 66 receives air under pressure from the main supply conduit 24 through a main branch conduit 71, a branch conduit 72 and inlet and exhaust conduits 73 and 74. The actuating rod 70 is rigidly connected to the bead ring frame 55 by means of a nut 75 that is screwed onto the threaded end portion of said rod whereby said frame moves axially in unison with the piston 68.

The left bead ring frame 54 is swung vertically about the shaft 58 in response to axial movement of the right frame 55 by means including a central pinion gear 76 and upper and lower horizontal racks 77 and 78. The pinion gear is mounted for rotation about a fixed horizontal axis on a central lateral shaft 79 that is carried by a central guide member 80, said guide member rigidly connected to and supported in a fixed position by the guide rods 60. The lower rack 78 is rigidly connected to the right frame 55 and is guided horizontally and held against the teeth of the pinion 76 by the rack guide 80. The upper rack 77 is guided parallel to the rack 78 and is held in engagement with the teeth of the pinion 76 and the gear segment 62 by the rack guide 80 and a detachable lateral metal strap 83 rigidly connected to the U-shaped member 59.

A pair of adjustable laterally alined metal stop collars 81 are mounted in predetermined adjusted positions on the guide rods 60 between the left bead ring frame 54 and the rack guide 80 and a pair of similar adjustable stop collars 82 are mounted on said rods between the right bead ring frame 55 and said rack guides. Said collars limit the axial inward movement of the bead positioning annuli 50 and 51 and can be adjusted to accommodate tires of different widths.

When the motor 66 is energized to move the actuating rod 70 toward the drum D, the bead positioning member 51 is moved toward the shoulder of said drum and the pinion 76 is rotated by the lower rack 78 so as to move the upper rack 77 toward said actuating rod. Such movement of the upper rack rotates the gear segment 62 and the bead ring frame 54 to move the cam followers 63 out of the cam slots 65 and moves the bead positioning member 50 toward the left shoulder of the drum to the position shown in Fig. 6. The cam slots 65 are located so as to swing the member 50 over the end of the shaft 5 to the retracted position shown in Fig. 1.

The present invention provides improved means for turning or lapping the end portions of the fabric over the bead rings after the rings have been positioned on the fabric. Such fabric lapping means comprises a series of regularly circumferentially spaced curved radial metal turn-over fingers or arms 84 at opposite ends of the drum D which are moved over the shoulders of the drum by an actuating means similar to the actuating means of the aforesaid Patent No. 2,614,952 including a pair of annular metal actuating members 85 and 86 mounted for axial sliding movements on the shaft 5, upper and lower horizontal racks 87 and 88 mounted for axial movement within the shaft 5, a central pinion gear 89 meshing with the teeth of said racks for causing said racks to move in opposite directions, and a hydraulically-damped double-acting pneumatic reciprocating piston motor 90 similar to the motor 66 described above for moving the pipe 29 axially.

Air under pressure is supplied to the reversible motor 90 from the main supply conduit 24 and the main branch conduit 71 through a branch conduit 91, a solenoid-operated reversing valve 92, similar to the valve 67, and inlet and exhaust conduits 93 and 94. The piston rod of the motor 90 is rigidly connected to a non-rotatable connecting member 95 which is operably connected to the end portion of the rotatable pipe 29 as best shown in Figs. 2 and 3, said connecting member being movable from one end of the stroke of the piston as shown in solid lines in Fig. 2 to the other end of said stroke as shown in dot-dash lines in Fig. 2. If desired, movement of the motor 90 may be damped by a hydraulic cylinder or dash-pot 290 as best shown in Fig. 23.

The rack 87 is connected by a pin 97 to a bifurcated actuating member or yoke 96 that is integrally connected to the spool 30, axial movement of the pipe 29 by the motor 90 causing the rack to move axially. The racks 87 and 88 are connected to the actuating members 85 and 86, respectively, by lateral cylindrical pins 98 and 99 which project through horizontally elongated slots 100 and 101 of uniform width in the hollow drum shaft 5. The slots permit the motor 90 to move through its full stroke so as not to interfere with axial movement of the actuating members.

The pinion gear 89 is mounted for rotation on a lateral cylindrical pin 102 which projects through small circular openings in the shaft 5 and has end portions mounted in the intermediate member 17. The pin also extends through alined circular openings in an externally cylindrical rack guide 103 which holds the racks 87 and 88 against the pinion 89 and assists the pins 97 and 98 in guiding the racks axially.

Each of the turn-over fingers 84 is generally arcuately curved and has a rounded outer end portion 104 with an arcuate socket to receive a helical annular garter spring or stitching ring 105 or other resilient annular constraining means which may be expanded over the drum D. The rounded inner end of each finger has a circular opening therein to receive a cylindrical pivot pin 106 which is carried by a yoke or U-shaped bearing bracket 107. The brackets 107 are regularly spaced around the peripheries of the actuating members 85 and 86 and are rigidly connected thereto by bolts or screws 108.

The turn-over fingers 84 at each end of the drum D are swung radially about their pivots 106 to expand the two helical garter springs 105 over the opposite end shoulders of the drum in response to axial movement of the actuating members, said springs serving as stitching rings to lap the fabric end portions over the bead rings and to adhere said portions to the underlying fabric. Cam means are provided to swing the turn-over fingers radially in unison including large annular metal stop members 109 rigidly connected to the cantilever shaft 5 at opposite ends of the drum D and a series of regularly circumferentially spaced adjustable U-shaped fulcrum bars or guide stops 110 of circular cross-section rigidly connected to the stop members and projecting axially inwardly therefrom at opposite ends of the drum. Each U-shaped member 110 has straight parallel legs on opposite sides of a finger 84 and out of the path of movement of said finger which fit tightly in internally cylindrical holes in one of the stop members 109. Said legs are held in adjusted positions by radial setscrews 111 as best shown in Fig. 7. The inner portions of the members 110 are turned radially outwardly, and the intermediate central cam portions 113 of said members are straight and substantially parallel to the pivotal axis of the fingers 84 to provide axially outwardly projecting pivots or fulcrums for slidably engaging the axially inner surfaces of said fingers during axial inward movement of the actuating members 85 and 86.

The stop members 109 are provided with rounded axially inwardly projecting annular cam or fulcrum portions 112 of uniform axial cross-section radially inwardly of the cam portions 113 and on the opposite sides of the turn-over fingers 84, said annular portions slidably engaging the axially outer surfaces of said fingers to provide pivots for the fingers. The metal fingers 84 are identical and are provided with smoothly curved outer and inner cam surfaces 114 and 115 for engaging the fulcrum portions 112 and 113, respectively, said surfaces being shaped substantially as shown in the drawings so that the turn-over fingers function substantially as indicated in Figs. 11 to 17.

As herein shown, the upper portion of each stop member 109 is reduced in thickness to provide a smoothly curved surface 116 out of the path of movement of the turn-over fingers that extends from the annulus 112 to the outer surface of the stop member, and the lower portion of each stop member has a flat vertical surface 117 that extends from the annulus 112 to the drum shaft 5.

It is believed that the method of building a tire on the drum D will be apparent from Figs. 11 to 17 of the drawings. Strips of tire cord fabric of the same width are wrapped around the drum D in conventional manner with the side edges arranged in staggered relation as indicated in Fig. 11 to form an annular multiple-ply fabric layer 118 having opposite end portions 119 extending axially beyond the shoulders of the drum D and over the fingers 84, the stitching rings 105, and the stop members 109. The valve 27 may then be opened to supply high pressure air to the air bags 20 and 21 so as to expand the drum D as shown in Fig. 12.

The motor 66 may then be energized to move the bead positioning members 50 and 51 axially inwardly over the end portions 119 and to press the rubber-coated inextensible metal bead rings 53 toward the shoulders of the drum and against said end portions, while holding said bead rings concentric to the shoulders of the drum substantially as shown in Fig. 13. The bead centering lugs 38 resist movement of the fabric toward the drum and assist in pushing the bead rings concentric to the drum. Since the bead rings have a tacky rubber surface, they will adhere to the fabric layer 118 when they are pressed against said layer by the bead-positioning members 50 and 51. After the bead rings are adhered to the fabric layer, the motor 66 is actuated in the opposite direction to withdraw the bead placing members 50 and 51, leaving the bead ring 53 accurately positioned on the end portion of the fabric substantially as indicated in Fig. 14.

After the bead rings 53 are positioned as indicated in Fig. 14 and the bead-placing members 50 and 51 are retracted away from the drum shoulders, the motor 90 is actuated to move the actuating members 85 and 86 axially outwardly so as to move the inner ends of the turn-over fingers outwardly as indicated in Fig. 15. Such movement causes the outer cam surfaces 114 of the fingers 84 to slide along the inwardly projecting surfaces of the annular fulcrum portions 112 and causes the radially outer portions 104 of the fingers to move radially outwardly and axially inwardly over the opposite shoulders of the drum to lap the fabric end portions or flippers 119 over the bead rings 53. As the pivot pins 106 approach the stop members 109, the stitching rings 105 are contracted to press the staggered end portions of the tire fabric against the underlying fabric on the drum substantially as shown in Fig. 16. The motor 90 is then actuated in the opposite direction to move the members 85 and 86 axially inwardly as indicated in Fig. 17. As the cam pins 106 move away from the stop members 109, the inner cam surfaces 115 engage the fulcrum bars 113 to swing the stitching rings 105 radially outwardly and axially outwardly away from the drum.

After the turn-over fingers 84 have been retracted, the drum D is rotated and a layer of elastic rubber 120 of uniform width is cemented to the fabric 118 substantially as indicated in Fig. 18. The layer 120 comprises a conventional tread portion 121 and conventional side wall portions 122 and 123 which decrease in thickness toward the sides of the drum.

The rubber layer 120 may be stitched to the fabric in any suitable manner, for example, as in the aforesaid Patent No. 2,614,952. However, the present invention provides an improved tread stitching means which may be operated rapidly and which effectively adheres the tread and side wall portions to the fabric. The tread stitching means S shown in Figs. 4 and 5 includes a metal supporting bracket 124 having alined openings therein which support a pair of shafts 125 and 126 parallel to the drum shaft 5. The bracket 124 is rigidly connected to the upper end of a tubular metal arm 127 having an axially elongated internally cylindrical connecting portion 128 at its lower end. Said connecting portion fits on a horizontal cylindrical shaft 129 below the drum and is keyed to said shaft for swinging movement therewith. The opposite ends of said shaft are mounted in bearing members 130 and 131 carried by the housing 2 and the standard 3.

The bracket 124 is swung toward and away from the drum D by an actuating mechanism including a double-acting reciprocating piston pneumatic motor 132 and a rigid lever 133 connected between said motor and the arm 127. The lever 133 is rigidly connected to the connecting portion 128 and is pivotally connected to the piston rod 134 of the motor by means including a yoke 135 and a pivot pin 136.

The motor 132 comprises an internally cylindrical cylinder 137 that is pivotally connected to the supporting member 4 by a yoke 138 and a pivot pin 139 that extends through a lug 140 carried by said supporting member. The cylinder has inlet and exhaust conduits 141 and 142 leading to opposite ends of the cylinder. Air under pressure is supplied to the conduits 141 and 142 through the branch conduit 71 by means of a solenoid-operated reversing valve 143 similar to the valves 67 and 92.

As herein shown, the shaft 126 is held in a fixed position on the bracket 124 by setscrews 144 at opposite ends of the shaft. An externally cylindrical tubular shaft or sleeve 145 is rotatably mounted on the shaft 126 concentric to said shaft by needle bearings 146 near the ends of the shaft as shown in Fig. 5, the sleeve 145 extending substantially between the vertical portions of the bracket 124.

A multiplicity of flat annular aluminum disks 147 are arranged in parallel superposed relation on the sleeve 145 and are free to rotate relative to said sleeve, the flat surface of each disk frictionally engaging the flat surface of the adjacent disks substantially as shown in Fig. 5. Each of the disks has an internal cylindrical surface 148 with the same diameter which is slightly greater than the external diameter of the sleeve 145 so that the disk may move a small distance radially relative to said sleeve. The disks are externally cylindrical and decrease in diameter toward the center of the shaft substantially as shown in Fig. 5 so as to conform substantially to the shape of the rubber layer 120. As herein shown the disks near the ends of the shaft are substantially of the same external diameter and the disks near the center of the shaft are also of substantially uniform diameter. The disks are held together and are held against axial movement by annular collars 149 which engage the vertical portions of the bracket 124 as shown in Fig. 5.

The shaft 125 may be rigidly mounted on the bracket 124 substantially like the shaft 126. However, the shaft 125 is preferably adjustably mounted so that said shaft may be moved toward and away from the plane containing the axes of the shafts 5 and 126. As herein shown, the plane containing the axes of the shafts 125 and 126 is inclined with respect to the plane containing the axes of the shafts 5 and 126. The angle of inclination may be up to about 30°, is preferably in the neighborhood of about 5° to 25°, and may be adjusted within that range to give best results.

In order to provide for adjustment of the shaft 125, the vertical portions of the bracket 124 are provided with alined arcuate slots 150 coaxial with the shaft 126 and of a size to receive the reduced end portions 151 of the shaft 125, the annular shoulders at the inner ends of the portions 151 engaging the bracket 124 to prevent axial movement of the shaft. The outer ends of the shaft are externally threaded to receive a hexagonal nut 152 which may be tightened against the bracket to hold the shaft 125 in a fixed position relative to the bracket.

A tubular shaft or sleeve 153 is rotatably mounted on the shaft 125 by needle bearings 154 near opposite ends of the shaft, said needle bearings holding the sleeve coaxial with the shaft. A deformable elastic rubber sleeve 155 is mounted on the metal sleeve 153 to provide a yieldable backup roll for engaging the disks 147. The sleeve has end portions 156 of substantially uniform diameter and an enlarged central portion 157 of substantially uniform diameter that decreases in diameter toward its opposite ends to provide frusto-conical surfaces 158. The backup roll 155 conforms substantially to the contour of the disks 147 and the shape of the rubber layer 120 so as to apply pressure evenly to said rubber layer.

The clearance between the sleeve 145 and the internal cylindrical surfaces of the disks 147 permits independent movements of the disks when the disks are pressed against the layer 120. The friction between the disks and the rubber of the layer 120 and the sleeve 155 causes rotation of the disks and the sleeve whenever the disks are pressed against the drum D. The rubber of the sleeve 155 is soft and elastic and may be deformed by the disks 147 so that the disks conform to the shape of the tire on the drum D.

Figure 22 is a view similar to Fig. 5 showing a modified tread stitcher S$^a$ which may be employed in the tire building machine of Figs. 1 to 21 in place of the tread stitcher S. The stitcher S$^a$ is substantially the same as the stitcher S except that the disks are all the same size and the backup roll is cylindrical. The stitcher S$^a$ includes a pair of shafts 125' and 126' mounted on the bracket 124 parallel to the shaft of the drum, the shaft 125' having reduced cylindrical portions which fit in the elongated arcuate slots 150 of said bracket and having threaded end portions 151' for receiving nuts 152'. The shaft 126' is held in a fixed position on the bracket 124 by setscrews 144.

A multiplicity of flat externally cylindrical annular aluminum disks 147' are arranged in parallel superposed relation on a sleeve 145' carried by the shaft 126', each disk having an internal cylindrical surface 148' with a diameter substantially greater than the external diameter of said sleeve so that each disk may rotate and move independently of the other disks a small distance radially relative to said sleeve. Each of the disks 147' is of the same size and shape, the clearance between the surfaces 148' and the sleeve 145' permitting the disks to conform to the shape of the tire casing on the drum. Collars 149' are provided to hold the disks together as indicated in Fig. 22.

A soft, deformable, annular elastic rubber sleeve 155' is mounted on a metal sleeve 153' carried by the shaft 125' and engages the disks 147' yieldably to resist movement of the disks toward the shaft 125' and away from the tire building drum. When the disks are pressed against the tire casing on the drum, the sleeve 155' deforms sufficiently to permit the disks to conform to the shape of the tread and causes the disks to apply an increased pressure at the tread portion of the tire and sufficient pressure at the side wall portions of the tire. The sleeve 155' is preferably made of soft red rubber tube stock of the type used to make ordinary inner tubes. The sleeve may be externally cylindrical as shown in the drawings.

The controls for the small tire building machine of Figs. 1 to 21 are shown schematically in Fig. 23 so that it will be apparent how the operations may be effected. The controls include a series of hand-operated switches 159 to 162 which are operatively connected to the solenoids of the valves 27, 67, 92 and 143, respectively, and a pair of foot-operated switches 163 and 164 which are operatively connected to the solenoids 165 and 166, respectively, of the three-pole switches 167 and 168.

Before building of a tire on the drum D, the tire-building machine appears as indicated in Fig. 1. By pressing on the foot pedal at 163, the switch 167 is closed to effect rotation of the motor 9 in one direction. Such rotation causes movement of the chains 11 and 12 to rotate the drum shaft 5 and the drum D mounted thereon. A strip of bias cut fabric may be placed on the drum while it is rotating, and thereafter the foot pedal at 164 may be depressed to rotate the drum in the opposite direction while another strip of fabric is applied to the drum, closing of the switch 164 causing the switch 168 to close so as to rotate the motor 9 in the opposite direction. The bias cut fabric may, therefore, be applied to the drum in the conventional manner to form the multiple-ply fabric layer 118 is shown in Fig. 6, the cords of each ply having a bias at an angle to that of the next adjacent ply.

After the multiple-ply fabric layer 118 has been formed on the drum, the switch 159 may be closed to effect opening of the valve 27 whereby high pressure air is supplied through the coupling 28 and the pipe 29 to the air bags 20 and 21. The high pressure air in the air bags expands the bags and presses the fabric layer 118 radially outwardly to the position indicated in Fig. 12.

After the drum has been expanded, the bead-setting switch 160 may be closed to energize the solenoid associated with the valve 67. This operates the valve so as to supply high pressure air from the branch conduit 72 to the conduit 74 whereby the piston 68 is pressed toward the pinion 76. As the piston rod 70 moves toward said pinion, the rack 78 rotates the pinion and causes the upper rack 77 to move toward the motor 66. Movement of the upper rack rotates the gear segment 62 and the bead-ring frame 54 to swing the bead positioning ring 50 and the bead ring 53 over the end portion of the fabric layer 118 to the position indicated in Fig. 13. The bead rings are pressed toward the drum and against the fabric layer 118 so that they adhere to said layer.

It is preferable to provide a hydraulic dash-pot 170 for reducing the speed of movement of the piston 68, air pressure alone giving too jerky and accelerated a push. The dash-pot gives a smoother and more even motion and eliminates any unnecessary slamming and the like.

When the bead rings 53 are positioned adjacent the shoulders of the drum D and adhered to the fabric as indicated in Fig. 13, the garter springs or stitching rings 105 are within the fabric layer 118 radially inwardly of the members 50 and 51 and the curved turn-over fingers 84 are resting against the fulcrum portions 112.

The bead setting switch 160 may then be opened to deenergize the solenoid of the valve 67 whereupon said valve is moved to connect the conduit 72 to the conduit 73 so as to retract the piston 68. As the piston rod 70 is moved away from the pinion 76, the bead positioning members 50 and 51 are moved away from the shoulders of the drum, leaving the bead rings 53 adhering to the tire fabric 118 as indicated in Fig. 14. At this time the garter springs 105 are radially inwardly of the bead rings 53 and the end portions 119 of the fabric.

The switch 161 is then closed to energize the solenoid of the valve 92 whereupon high pressure air is supplied through the valve from the conduit 91 to the conduit 93. This energizes the motor 90 to move the connecting member 95 away from the drum shaft 5, said connecting member moving the pipe 29 and the yoke 96 away from the drum. Such movement effects rotation of the pinion gear 89 and movement of the racks 87 and 88 in opposite directions whereby the actuating members 85 and 86 are moved axially outwardly. As each actuating member is moved, the cam surface 114 of each turn-over finger slides along the fulcrum portion 112 and the finger pivots about the axis of the pin 106.

During the first portion of the axial outward movement of the actuating members and the pins 106, the outer portions of the turn-over fingers are moved radially outwardly in unison to expand the garter springs 105 and to lift the end portions 119 of the fabric as indicated in Fig. 15. As movement continues the garter springs 105 are moved axially inwardly to lap the end portions or flippers 119 over the bead rings 53 as indicated in Fig. 16. As the pivot pins 106 of the turn-over fingers approach their axially outward positions nearest the stop members 109, the stitching rings 105 contract and move radially inwardly to press the staggered end portions of the fabric tightly against the underlying fabric layer on the drum to adhere said end portions to said layer.

After the end portions 119 are lapped over the bead rings 53, the switch 161 is opened to deenergize the solenoid of the valve 92 whereupon high pressure air is applied to the conduit 94 and the motor 90 is actuated in the opposite direction to move the actuating members 85 and 86 axially inwardly. After the actuating members have moved inwardly a short distance, the cam surface 115 of each turn-over finger engages the fulcrum bar 113 to swing the outer portion 104 of the finger outwardly. This causes the stitching ring 105 to expand and to move axially outwardly away from the drum as indicated in Fig. 17. When the motor 90 reaches the end of its stroke, the fingers 84 are returned to their original positions as indicated in Fig. 6.

One of the switches 163 and 164 is then closed to rotate the drum D and cement is applied to the fabric on the drum. During rotation of the drum the rubber layer 120 is applied and a splice is effected in the conventional manner. The switch 162 is then closed to energize the solenoid of the valve 143 whereupon the motor 132 is actuated to press the bracket 124 toward the drum D. The disks 147 are then pressed against the layer 120 to stitch the tread and side wall portions of the tire to the fabric on the drum and to force out any air between the outer rubber layer and the inner fabric layer.

After the tread stitching is completed, the switch 162 is opened to deenergize the solenoid of the valve 143 whereupon the pneumatic motor 132 is actuated in the opposite direction to move the disks 147 away from the drum. The switch 159 is then opened to effect closing of the valve 27 and to exhaust air from the air bags 20 and 21. This causes the air bags to collapse and permits removal of the tire from the drum, the garter springs 37 and 42 causing the metal shell of the drum to contract.

If desired, the bead-set switch 160 may be actuated before the expand switch 159 to position the bead rings 53 over the end portions of the fabric before the drum is expanded as shown in Fig. 6. While the bead-positioning members 50 and 51 are in their axially innermost positions adjacent the drum shoulders, the switch 159 may be closed to expand the air bags 20 and 21 whereby the tacky rubber surface of the fabric layer 118 is pressed against the tacky inner surfaces of the bead rings 53 and is caused to adhere to said rings.

Figures 24 to 35, inclusive, show a modified form of tire building machine which is similar to the machine of Figs. 1–21 but is designed to build larger tires. The machine has a rigid metal frame F', a rotatable cylindrical drum D', and a tread stitching means S' for pressing the tread portion of the tire against the drum. The frame includes a box-like housing 2a and a standard 3a similar to the housing 2 and standard 3 of the small tire building machine.

The drum D' is constructed substantially like the drum D described above and functions in substantially the same way during building of a tire. The drum is mounted on the end of a cylindrical cantilever shaft 5a that is journalled in bearings 6a and 7a carried by the housing 2a of the frame F' as best shown in Fig. 25. The drum shaft 5a may be rotated in either direction by a suitable driving means including a reversible electric motor and a driving connection from said motor to the shaft. The driving connection includes a series of endless V-belts 12a and a pulley 171 that is keyed to the drum shaft for rotation therewith.

The drum D' is rigidly connected to the shaft 5a exteriorly of the housing 2a as shown in Figs. 25 and 29. Said drum has a pair of rigid annular metal supporting members 13a and 14a concentric to the shaft 5a and a pair of rigid annular supporting members or hubs 15a and 16a that are rigidly connected to the members 13a and 14a by attaching bolts 172. The hubs 15a and 16a are rigidly mounted on a pair of axially adjustable sleeves 173 and 174 which are keyed to the shaft 5a as indicated in Fig. 29.

An intermediate rigid member 17a is rigidly mounted on the shaft 5a between the sleeves 173 and 174 and is held against axial movement on said shaft. The member 17a has an internally cylindrical opening therein to receive the externally cylindrical central portion of a horizontal adjusting screw 18a. The screw has collars 19a rigidly connected thereto on opposite sides of the intermediate member 17a to prevent axial movement of the screw and has a square head 194. The screw is externally threaded at its opposite ends to fit in internally threaded openings in the hub members 15a and 16a whereby axial movement of said hub members is prevented. The screw 18a, like the screw 18, permits adjustment of the width of the drum so that various size tires may be built on the drum.

The rigid annular members 13a and 14a are provided with two pairs of annular recesses 175 and 176 of the same axial width which have radially inner cylindrical surfaces of the same diameter which are concentric to the drum shaft 5a as best shown in Fig. 29. Two pairs of annular externally cylindrical pneumatic rubber bags or tubes 20a and 21a are mounted in the circumferential recesses 175 and 176 to fill such recesses. Means are provided for inflating the pneumatic tubes simultaneously and for interconnecting said tubes including air inlet connections 22a and air conduits 23a which extend axially through the drum.

Air under pressure is supplied to the annular tubes 20 and 21 from a pneumatic pump or other source of air under pressure generally in the same way as described in connection with the small tire building machine of Figs. 1–21, the air passing through a branch conduit 26a and a non-rotatable pneumatic coupling 28a to a flexible hose 177 at one end of the shaft 5a. The air travels from the hose 177 through a long pipe 29a to the inlet end of the conduit 23a.

The drum D' is provided with expansible metal shell means of cylindrical form including a multiplicity of narrow metal strips 34a of substantially uniform width which extend axially across the annuli 20a and 21a. Each of said strips has substantially segmental end portions 35a at its opposite ends that are bent axially inwardly at their radially inner ends to form arcuate flanges or hooks 36a. Said hooks are shaped to support expansible and contractible annular garter springs 37a and hold said springs concentric to the shaft 5a, said springs pressing the metal strips 34a radially inwardly against the outer surfaces of the annular tubes 20a and 21a.

A series of regularly circumferentially spaced bead-ring-positioning lugs 38a may be rigidly connected to some of the strip portions 35a at the opposite ends of the drum to assist in positioning the bead rings concentric to the drum. Each lug 38a is riveted to a segmental portion 35a and has a tapered bead-engaging surface 39a.

The annular space between the rigid annular members 13a and 14a may be covered in any suitable manner. As herein shown, the drum D' is provided with a series of arcuate sheet metal spanning members 40a of uniform width and uniform thickness which are yieldably connected to the intermediate member 17a. As herein shown, said intermediate member is in the form of a spider having four radial cylindrical arms 178 which receive four radial rods 179. Longitudinal supporting bars 280 are rigidly connected to the rods 179 for engaging the inner surfaces of the arcuate members 40a. Each of the arcuate strips 40a extends more than 90° around the periphery of the drum and is rigidly connected to one of the rods 179 by an attaching screw 180 located at the center of the strip. The rods 179 are mounted for radial sliding movements in annular plugs 181 located at the outer ends of the arms 178. The radially inner ends of the rods 179 are provided with hex-head bolts 195 which project axially outwardly through radially elongated slots 182 in the arms 178. A helical compression spring 183 is provided in each of the arms 178 between the plug 181 and the radially inner end portion of the rod 179 to bias the rod radially inwardly. The springs 183 press the arcuate strips 40a against the radially outer surfaces of the metal strips 34a and assist in holding the strips against the pneumatic annuli 20a and 21a. The four strips 40a completely cover the space between the annular members 13a and 14a during expansion and contraction of the drum D' and cooperate with the strips 34a to provide an expansible and contractible cylindrical shell for the drum.

If desired, the drum may be covered with a thin imperforate circumferentially continuous elastic rubber sheet 48a of uniform width and uniform radial thickness as shown in Fig. 30. The sheet has radially inwardly extending end portions 184 which engage the segmental portions 35a substantially throughout their length and prevent axial movement of the rubber sheet on the drum. Where the end portions 184 extend radially inwardly beyond the bead-positioning lugs 38a, said end portions are provided with openings of a size to receive said lugs and with thickened edge portions 185 radially inwardly of said lugs to reenforce the sheet.

Fig. 31 shows a modified form wherein the rubber sheet 48b covering the drum D' is provided with end portions 184a which extend radially inwardly along the portion 35a and terminate at the top of the bead-engaging lugs 38a. As herein shown, the end portions 184a are thickened to prevent axial movement of the sheet on the drum.

The drum D' is provided with bead placing means similar to those employed on the drum D described above. Such bead placing means includes a pair of pivoted annular bead-ring-positioning members 50a and 51a having cylindrical sheet metal strips 52a for supporting a pair of inextensible rubber-coated metal bead rings 53a. The bead supporting members 50a and 51a are mounted on U-shaped bead-ring frames 54a and 55a for pivotal movement about horizontal axes. The left frame 54a has two lower arms which are keyed to a lateral shaft 58 that is journaled for rotation in an axially movable actuating member. The frame 54a is provided with horizontally alined trunnions 56a which support the member 50a concentric to the shaft 5a when the bead ring is positioned adjacent to the shoulder of the drum.

The bead positioning rings 54a and 55a are moved toward and away from the shoulders of the drum D' by means including a pneumatic double-acting reciprocating piston motor 66a, a piston rod 70a and a rack-and-pinion actuating means including a pinion gear 76a, and upper and lower racks 77a and 78a. The actuating rod 70a is rigidly connected to the right bead ring frame 55a by means including a nut 75a whereby said frame moves axially in unison with the reciprocating piston of the motor 66a. The actuating rod 70a slides axially in an internally cylindrical opening in the frame 55a and is provided with an adjustable stop collar 186 as shown in Fig. 25.

The tire building machine of Figs. 24 to 35 is provided with fabric lapping means similar to the means employed on the machine of Figs. 1–21 including a series of regularly circumferentially spaced, curved, radially extending, turn-over fingers or stitching fingers 84a. Said fingers are similar to the fingers 84 described above and function in generally similar manner but are provided with elongated slots at their inner ends which provide an improved stitching action.

The actuating means for the fingers 84a includes annular actuating members 85a and 86a which are mounted for axial sliding movements on the sleeves 173 and 174, upper and lower horizontal racks 87a and 88a mounted for axial movement within the shaft 5a, a pair of centrally located pinion gears 89a that mesh with the teeth of said racks, and a double-acting pneumatic reciprocating piston motor 90a for moving the rack 87a axially.

The rack 87 is connected to an actuating rod 96a for axial movement in unison with said rod. The racks 87a and 88a are connected to the actuating members 85a and 86a, respectively, by lateral cylindrical pins 98a and 99a which project through longitudinally elongated slots 100a and 101a in the drum shaft 5a. A pin 102a extends through an externally cylindrical rack guide 103a within the drum shaft and through said shaft into the spider 17a to prevent axial movement of said rack guide and said spider. The annular rack guide 103a holds the racks 87a and 88a against the pinions 89a and guides them axially.

Each of the turn-over fingers 84a is generally arcuately curved along its length and has an arcuate outer end portion 104a which grips a helical annular garter spring or stitching ring 105a. Twelve fingers 84a are provided at each end of the drum to support one of the stitching rings 105a.

Each finger 84a has an enlarged inner end portion 187 that is provided with an elongated slot 188. The end portions 187 are pivotally connected by means of externally cylindrical pins 106a that fit in the slots 188 to a series of regularly circumferentially spaced brackets 107a that are rigidly connected to the actuating members 85a and 86a by means of attaching screws or bolts 108a.

As shown in Fig. 29, each slot 188 is elongated axially, the major portion thereof being parallel to the axis of the shaft 5a when the actuating pins 106a are in their axially innermost positions. The slot has a width substantially equal to the diameter of the pins 106a so that the pin may move from one end of the slot to the other.

The fingers 84a are swung radially about their pivots 106a to expand the stitching rings 105a over the opposite end shoulders of the drum. A pair of large annular metal stop members 109a are rigidly mounted on the metal sleeves 173 and 174 beyond the ends of the drum and are held against axial movement relative to the drum. The stop members have an external diameter less than that of the annular members 13a and 14a and are located so that they do not interfere with movement of the bead-supporting members 50a and 51a.

Cam means are provided for swinging the turn-over fingers 84a radially over the shoulders of the drum including cam members 112a and 113a mounted on the stop members 109a at opposite ends of the drum. Said cam members function substantially like the cam members 112 and 113 of the drum D described above and provide pivots or fulcrums located at different radial distances from the axis of the shaft 5a. Each cam member 112a is in the form of an annular externally cylindrical roller that is mounted for rotation on a cylindrical pin 189 parallel to the pin 106a associated with the turn-over finger which engages said roller. The pins 189 are rigidly mounted on brackets 190 which are rigidly connected to the stop members 109a by attaching screws or bolts 191. The cam rollers 112a are regularly spaced around the circumference of each stop member 109a and are located the same radial distance from the axis of the shaft 5a, so as to move the turn-over fingers in unison while holding the stitching rings perpendicular to the drum axis and concentric to the drum.

Each fulcrum rod 113a is in the form of an endless circular ring of circular cross-section and is supported concentric to the shaft 5a and perpendicular to the drum axis by six longitudinal supporting bars 110a as indicated in Fig. 29. The rods 110a are welded at their inner ends to the fulcrum rings 113a and are adjustably and rigidly connected to the stop members 109a by hexagonal nuts 192 and 193 which are screwed on the threaded outer end portions of the rods 110a. The rings 113a may be adjusted axially by adjusting the position of the nuts 192 and 193. The rings 113a are located axially inwardly of the outer portions of the fingers 84a between the fingers and the ends of the drum as indicated in Fig. 29. The radius of each ring 113a is substantially greater than the distance from each cam roller 112a to the axis of the drum shaft so that said ring provides a pivot for each turn-over finger radially outwardly of the pivot provided by the cam roll. The fingers 84a are identical and are provided with smoothly curved substantially arcuate outer and inner cam surfaces 114a and 115a for engaging the axially projecting portions of the fulcrum members 112a and 113a.

The upper rack 87a is moved axially by the motor 90a through an actuating mechanism including a pair of longitudinal actuating rods 96a and 196 and an actuating slide 197 that is connected to said rod 196. The rod 196 is enlarged at one end and is internally threaded to provide a socket 198 for receiving the externally threaded end portion of the rod 96a whereby the rods 96a and 196 move axially in unison. The slide 197 is in the form of a hollow cylindrical piston or sleeve having end plugs 199 at its opposite ends. Said end plugs have alined circular openings therein to receive the pipe 29a and the actuating rod 196, one of the openings for said rod being internally threaded to receive an externally threaded intermediate portion 200. The portion 200 screws into the plug 199 so that the slide 197 and the rod 196 move axially in unison. An externally cylindrical plug 201 is rigidly mounted within the drum shaft 5a and has circular openings therein of a size to receive the pipe 29a and the rod 196, said rod having a square or non-circular tool-receiving end portion 202 that extends axially outwardly beyond the plug 201.

A removable plug 203 is provided at the end of the drum shaft 5a for supporting the pneumatic coupling 28a and the outer end of the flexible hose 177, said plug establishing communication between the coupling 28a and said housing so that air under pressure may be supplied through the inlet connection 26a to the pipes 23a and 29a. As herein shown, the plug 203 is provided with a narrow cut or slot 204 so that the plug may be expanded radially against the inside of the drum shaft. An internally threaded opening is provided near the open end of the slot 204 to receive an expanding screw 205.

The screw 205 may be rotated and moved axially to expand the plug 203 into gripping engagement with the internal cylindrical surface of the drum shaft. When the screw is rotated in the opposite direction, the plug is loosened and may be easily removed. The plug may be removed from the shaft 5a without detaching the flexible hose 177 so that a tool may be inserted inside the drum shaft against the square head 202 to rotate the actuating rod 196. In this manner the position of the actuating rod 96a may be adjusted axially relative to the slide 197. A similar tool may be inserted through the drum D' against the square head 194 to rotate the screw 18a. By adjusting the screw 18a and the rod 196, the tire building machine may accommodate a different size tire.

The slide 197 is connected to the pneumatic motor 90a by means including a non-rotatable two-piece metal actuating ring 206, a pair of metal links 207, and a metal lever 208. The two halves of the ring 206 are connected by bolts 209 and define an annular groove or recess for receiving a rotatable annular metal sleeve or bearing ring 210 which is held against axial and radial movements relative to the ring 206. The slide 197 is provided with alined circular openings to receive a pair of short pins 211 which project radially through diametrically opposed, longitudinally elongated slots 212 in the drum shaft 5a. The slots 212 have a uniform width substantially equal to the maximum diameter of the external cylindrical surfaces of the pins 211 so as to prevent rotation of the slide 197 relative to the drum shaft 5a while permitting axial movement of the slide within the drum shaft. The bearing ring 210 has alined circular openings therein of a size to receive the externally cylindrical heads of the pins 211 whereby the ring moves in unison with said pins. The actuating ring 206 is non-rotatable and is pivotally connected to the links 207 by bolts 213 as best shown in Fig. 29. When the drum shaft 5a is rotated, the ring 210 rotates in unison with said shaft within the actuating ring 206.

The opposite ends of the links 207 on opposite sides of the drum shaft 5a are pivotally connected to the bifurcated upper end portion 214 of the lever 208 by pins 215. The lever 208 is mounted for swinging movements on a horizontal transverse pivot pin 216 carried by the housing 2a and is pivotally connected at its lower end to the piston rod 217 of the motor 90a by a horizontal pivot pin 218 as shown in Fig. 25. When the piston rod is moved axially in one direction to swing the lever 208, the actuating ring 206 is moved axially in the opposite direction causing the rod 210 and the slide 197 to move in that direction. This causes axial movement of the rods 96a and 196 and effects movement of the actuating members 85a and 86a.

The larger tire building machine is provided with stitching means S' which is somewhat similar to the stitching means S of the small tire building machine described above. The tread stitching means S' includes a U-shaped bracket 124a, a pair of shafts 125a and 126a mounted on the vertical portions 224 of the bracket parallel to the drum shaft 5a, a rigid tubular arm 127a that is mounted for swinging movements on a shaft 129a, means for swinging the arm 127a including a double-acting reciprocating piston pneumatic motor 132a, a lever 133a rigidly connected to the arm 127a, and a piston rod 134a. The piston rod is pivotally connected to the lever 133a by means including a pivot pin 136a.

The motor 132a comprises a cylinder 137 that is pivotally connected to the housing 2a by a yoke 138a and a pivot pin 139a. The pivot pin extends through the yoke and a lug 140a that is rigidly mounted on the frame. The motor 132a functions like the motor 132 of the small tire building machine to move the stitcher S' into and out of engagement with the tire on the drum.

The vertical portions 224 of the bracket 124a are provided with alined circular openings of a size to receive the reduced end portions of the shaft 126a so as to hold the shaft in a fixed position relative to the bracket. An externally cylindrical tubular shaft or sleeve 145a surrounds the shaft 126a and is journaled for rotation on the shaft by needle bearings 146a at opposite ends of the shaft.

A multiplicity of rotatable flat annular aluminum disks 147a of uniform thickness are arranged in parallel superposed relation on the sleeve 145a with the side faces of each disk in engagement with the side faces of the adjacent disks as indicated in Fig. 34. Each of the disks is of the same size and has concentric internal and external cylindrical surfaces, the diameter of the internal surface 148a being substantially greater than the external diameter of the sleeve 145a so that each disk may move independently of the other disks a substantial distance radially relative to said sleeve. As herein shown, the internal diameter of each disk 147a is more than 50 percent greater than the external diameter of the sleeve 145a so that each disk may move more than one inch radially where the sleeve 145a has a diameter of two inches. The disks are held together by annular retainers 219 which are rigidly mounted on the opposite ends of the sleeve 145a, annular collars 149a being provided between the retainers and the vertical portions 224 of the bracket 124a.

A thin endless elastic rubber sleeve 347 of uniform axial width and uniform thickness is mounted on the external cylindrical surfaces of the disks 147a and extends the full distance between the retainers 219 so as to completely cover the disks. The sleeve is easily stretched to permit the disks to conform to the shape of the tire casing on the drum D'.

The shaft 125a may be rigidly mounted in a fixed non-adjustable position on the bracket 124a but is preferably adjustably mounted in alined arcuate slots 150a in the bracket portions 224 which have a width corresponding to the diameter of the reduced end portions 151a of the shaft. The end portions 151a are externally cylindrical within the bracket portions 224 and are externally threaded at their outer ends to receive hexagonal nuts 152a. The shaft may be moved to a predetermined adjusted position by loosening the nuts 152a, moving the shaft in the slots 150a to the desired position, and tightening the nuts 152a to hold the shaft in that position.

The plane containing the axes of the shafts 125a and 126a may be inclined up to about 30° with respect to the plane containing the axes of the shafts 5a and 126a.

The angle of inclination is preferably in the neighborhood of about 5° to 25° and may be adjusted anywhere within that range to give the desired pressure on the drum. The slots 150a are coaxial with the shaft 126a and have sufficient length to permit any desired adjustment within the above range.

Bearings 154a are provided near the opposite ends of the shaft 125a for rotatably supporting a pair of hub members 220 adjacent the inner faces of the vertical portions of the bracket 124a. A rigid metal cylinder 221 is rigidly connected to the hub members 220 by circumferentially spaced attaching bolts 222 near opposite ends of the shaft 125a. An axially elongated, externally cylindrical, elastic, rubber, air bag 155a is mounted on the cylinder 221 to provide a yieldable backup roll for the disks 147a. The air bag is drawn substantially to scale in Fig. 35 so that its construction will be apparent from the drawings. The bag 155a extends between the retainers 148a and engages all of the disks 147a as indicated in Fig. 34. The bag preferably has an axial length in the normal and unstressed condition that is more than five times the radial depth of the bag, and as herein shown, has an axial length more than ten times its radial depth. The bag is held on the cylinder 221 by means of circumferentially continuous, inextensible, rubber coated, metal, bead rings 225 which fit in annular grooves 226 in the cylinder 221.

The cylinder 221 and the air bag 155a are constructed substantially the same near their opposite ends and are substantially symmetrical about their medial plans so that a description of half of the backup roll is all that is needed for a complete understanding of the construction. Each bead ring 225 is surrounded by a single strip of rubber-coated fabric which extends around the side walls of the bag and axially inwardly toward the center of the air bag. The inner portion of the rubber-impregnated strip extends from the bead 225 along the side wall of the bag to provide an inner, circumferentially continuous, fabric ply 227 having a substantially uniform width greater than the radial depth of the air bag in its normal unstressed condition and not substantially greater than twice said radial depth. The outer portion of the strip extends from the bead around the side walls of the air bag, engaging the inner ply 227 throughout its width and extends axially inwardly beyond the ends of said inner ply to form an outer circumferentially continuous fabric ply 228 having a substantially uniform width greater than that of the inner ply 227. The outer ply 228 may have a width from about two to five times the normal radial depth of the air bag and preferably has a width not in excess of about one-third the axial length of the air bag.

The air bag has an inner impervious tubular rubber layer 229 of substantially uniform thickness which completely covers the inside of the air bag and provides an annular air-tight chamber 230 within the air bag for receiving air under pressure. The side portions of the tubular layer 229 are vulcanized to and integrally connected to the fabric from each bead ring 225 to the end of each ply 228.

A conventional air inlet connection is provided for supplying air to the chamber 230 including a flanged metal inlet conduit 231 and an umbrella-shaped annular elastic rubber sealing member 232 that is vulcanized to and integrally joined to the tube 229 and to said conduit so as to prevent leakage from the chamber 230. A circular opening 233 is provided in the cylinder 221 to receive the conduit 231 and the tubular portion of the rubber seal 232 as indicated in Fig. 34.

An outer layer of elastic rubber 234 is vulcanized to the outer ply 228 from the layer 229 at the inner face of each bead 225 to the axially inner end of the ply 228 and is vulcanized to the outer central portion of the layer 229 between the inner ends of the plies 228 so as to cover completely the side walls of the bag and the outer portions of the fabric and the inner layer 229.

An annular elastic rubber tread layer 235 of substantially uniform axial length and substantially uniform radial thickness is vulcanized to the outer surface of the layer 234 to provide a normally externally cylindrical surface for engaging the disks 147a. The layer 235 extends the full length of the bag and has tapering end portions which provide tapering annular shoulders 236 at the opposite ends of the air bag substantially as indicated in Fig. 35.

The rubber layers 229, 234 and 235 may be made from conventional rubber tire compounds and are vulcanized together with the fabric plies 227 and 228 to provide an integral tubular air bag. It will be noted that the fabric reenforcement for the air bag terminates at the axially inner ends of the plies 228 so that the central portion of the bag between said plies consists only of rubber with a substantially uniform thickness.

Since the fabric plies 227 and 228 are connected to the inextensible bead rings 225 and effectively resist stretching of the rubber, such plies tend to hold in the side portions of the air bag so that the bag remains substantially cylindrical when it is filled with air and expanded. This is quite unlike ordinary automobile tires wherein the internal air chamber tends to become circular in cross-section when it is filled with air. The bag 155a of the present invention is so constructed that the chamber 230 does not approach circular cross-section but remains substantially cylindrical.

When the motor 132a is energized to press the disks 147a against the tire on the drum D', the bag 155a is deformed as indicated in Fig. 36 and applies a substantially uniform pressure to the disks 147a. Deformation of the air bag permits the disks 147a to conform substantially to the shape of the rubber layer forming the tread and side wall portions of the tire and permits the application of the desired pressure so as to provide an effective stitching action. It will be noted that the difference between the internal diameter of the disks 147a and the external diameter of the sleeve 145a is substantially greater than the variation in radial thickness of the tire on the drum so that the disk 147a may readily conform to the shape of the tire. The bag 155a applies sufficient pressure so as to stitch the side wall portions of the tire properly and applies an increased pressure to the disks engaging the tread portion of the tire so that said tread portion and said side wall portions are properly adhered to the fabric layer 118a on the drum D'.

The operation of the stitching fingers 84a and the method of building the tire on the drum D' is generally the same as with the drum D of the same tire building machine. The drum D' is rotated in opposite directions and strips of bias-cut tire cord fabric are applied on the drum to form an annular rubber-impregnated fabric layer 118a having end portions 119a that extend beyond the opposite ends of the drum, the cords of each ply having a bias at an angle to that of the next adjacent ply. The end edges of the fabric plies are staggered and the end portions 119a are stepped as indicated in Figs. 32 and 33.

After the cylindrical layer 118a is applied to the drum, the drum is expanded and inextensible rubber-coated metal bead rings 53a are positioned by the members 50a and 51a against the fabric and adjacent the shoulders of the drum. If desired, the bead rings may be placed over the fabric and adjacent the drum shoulders before the drum is expanded; however, best results are obtained when the drum is expanded before the bead rings are moved over the projecting end portions 119a.

Since the fabric layer 118a and the bead ring 53a have tacky surfaces, they readily adhere to each other so that the bead rings remain in engagement with the fabric after the bead ring positioning members 50a and 51a are retracted. After said members are retracted, the end portions 119a of the fabric layer extend axially over the stitching rings 105a and the outer ends of the fingers 84a.

The motor 90a is then energized to cause axial outward movement of the actual members 85a and 86a from their retracted positions as indicated by the arrow in Fig. 32. During the first portion of the movement of the actuating members, the pin 106a of each finger 84a moves axially from a position at the inner end of the slot 188 to a position at the outer end of said slot as indicated at a in Fig. 32.

As the pins 106a continue their axial outward movement, the outer surfaces 114a of the turn-over fingers move radially outwardly to cause rotation of the cam rollers 112a and move the stitching ring 105a radially outwardly from the position a to the position b, pushing the end portions 119a radially outwardly as indicated in Fig. 32.

As the pins 106a continue to move axially outwardly, the curved fingers 84a are swung radially and the stitching ring 105a is moved axially inwardly to the position as indicated in dot-dash lines in Fig. 32.

The pins 106a are in engagement with the outer ends of the slots 188 an instant before the stitching rings press the end portions 119a against the fabric on the drum. However, contraction of the stitching rings is limited by the drum so that said rings cannot move very far radially inwardly after the fabric is in the position indicated in solid lines in Fig. 32.

As the pin 106a of each turn-over finger 84a approaches its axially outermost position nearest the stop member 109a, the stitching ring 105a is moved from the position c to the position d shown in solid lines in Fig. 32 and the enlarged inner end portion of the finger moves radially outwardly so that the pin 106a is located at the outer end of the slot 188 when the finger is in the said position d. The slots 188 permit the stitching rings 105a to apply a maximum pressure to the rubber-impregnated fabric 118a as the stitching rings are moved from position c to position d so that the end portions 119a are firmly adhered to the underlying fabric on the drum.

After the stitching rings have been moved axially inwardly to the position d, the motor 90a is actuated in the opposite direction to cause the actuating members 85a and 86a to move axially inwardly as indicated by the arrow in Fig. 32. If the actuating members 85a are accelerated rapidly, the pins 106a will remain at the outer ends of the slots 188 during the initial retraction of the actuating members so that the stitching rings 105a may be expanded out of engagement with the end portion 119a. However, it is preferable to provide a substantially semi-circular notch 238 at the inner end of each slot 188 to hold the cam pin 106a at said end during the initial portion of the finger retraction so that the actuating members 85a need not be accelerated rapidly.

During the initial portion of the axial inward movement of the actuating members 85a and 86a, the cam pin 106a of each turn-over finger moves into the notch 238 and the inner surface 115a of the finger is moved axially inwardly against the axially outwardly projecting portion of the ring 113a to expand the stitching ring 105a from the position d out of contact with the fabric to the position e shown in dot-dash lines in Fig. 33. As the pins 106a continue their axial inward movement, the stitching rings 105a are moved axially outwardly through positions f and g shown in dot-dash lines in Fig. 33 to a position h shown in solid lines in Fig. 33.

The path of movement of the stitching ring 105a as the actuating members 85a are retracted is radially outwardly of the path of movement of the stitching rings during axial outward movement of the actuating members since the pivots provided by the rings 113a are radially outwardly of the pivots provided by the cam rollers 112a. However, the stitching rings 105a are moved away from the fabric faster than the stitching rings 105 of the small tire building machine of Figs. 1-21 due to the fact that the pins 106a remain at the inner ends of the slots 188 as the stitching rings are moved axially outwardly.

As the stitching ring is moved from position g to position h, the tension in the ring causes the outer end portion 104a of the turn-over finger to move radially inwardly and the finger swings out of contact with the ring 113a and into contact with the cam roller 112a. As axial inward movement of the pin 106a continues, the pin moves out of the notch 238. Thereafter the pin 106a reaches its innermost retracted position axially inwardly of the position a as shown in Fig. 30.

A layer of vulcanizable rubber 120a, similar to the layer 120 described above, is then applied to the fabric layer 118 to form the tread and side wall portions of the tire. After the layer 120a is applied, the motor 132a is energized to swing the disks 147a against the layer 120a. The motor applies sufficient pressure to the arm 127a so that the layer is properly stitched to the fabric. The air bags 20a and 21a are then exhausted to collapse the drum D' and to permit removal of the tire from the drum. The tire may then be lifted off the drum and sent on to be further expanded and vulcanized in a tire mold.

It is to be understood that, in accordance with the provisions of the patent statutes, variations and modifications of the specific devices shown herein may be made without departing from the spirit of the invention.

Having described my invention, I claim:

1. In a tire building machine having a generally cylindrical expandable drum for receiving a plurality of fabric layers with end portions extending axially beyond the shoulders of the drum, means for radially expanding the drum, and means for positioning bead rings against the fabric end portions adjacent the drum shoulders, improved fabric lapping means for turning the end portions of the fabric layers radially outwardly and axially inwardly over the bead rings and the ends of the drum comprising: a series of circumferentially spaced radially extending curved fingers mounted at one end of said drum, an actuating member radially inwardly of the drum shoulders and mounted for movement axially relative to said drum, an expandable resilient constraining annulus, each of said fingers being pivotally connected at one end of said actuating member and being connected at its opposite end to said annulus, means for swinging said fingers radially outwardly substantially in unison in response to axial movement of said actuating member to move said resilient annulus from a first position within an axially extending end portion of said fabric to a second position radially outwardly of said drum including means for engaging the axially outer face of each finger to provide a first pivot radially inwardly of said drum shoulders and means for engaging the axially inner face of each finger to provide a second pivot radially outwardly of said first pivot.

2. In a tire building machine having a generally cylindrical drum, means for supporting an expansible and contractible stitching ring near the shoulder of said drum including a turn-over finger and an axially-movable actuating member pivotally connected to said finger radially inwardly of said drum shoulder, a first stop member on one side of said finger having an axially inwardly projecting portion engageable with the axially outer face of said finger to provide a first pivot radially inwardly of said drum shoulder, and a second stop member on the other side of said finger having an axially outwardly projecting portion engageable with the axially inner face of said finger to provide a second pivot nearer said drum shoulder, said finger engaging said first stop member and swinging radially about said first pivot to move said stitching ring axially inwardly over said drum when said actuating member is moved axially outwardly and engaging said second stop member and swinging in the opposite direction when said actuating member is moved inwardly.

3. In a tire building machine having a frame, a cantilever shaft, and a generally cylindrical drum mounted for rotation on said shaft, a pair of stop members mounted on said shaft and held against axial movement thereon, an actuating member mounted on said shaft within said drum for axial movement toward and away from said stop members, and a rigid metal finger pivotally mounted on said actuating member for swinging radially and extending between said stop members, said finger having generally arcuate surfaces for engaging said stop members during radial swinging of said finger.

4. In a tire building machine having a generally cylindrical expandable drum for receiving a plurality of fabric layers with end portions extending axially beyond the shoulders of the drum, means for radially expanding the drum, and means for positioning bead rings over the fabric end portions adjacent the drum shoulders, improved fabric lapping means for turning the end portions of the fabric layers radially outwardly and axially inwardly over the bead rings and the drum shoulders comprising: a series of circumferentially spaced curved fingers mounted at the end of said drum, an actuating member radially inwardly of the drum shoulder and mounted for movement axially relative to said drum, an expansible and contractible stitching ring, each of said fingers being pivotally connected at one end to said actuating member and at its opposite end to said stitching ring to hold said ring concentric to said drum, means for moving said actuating member axially, cam means for swinging said fingers radially substantially in unison in response to axial movement of said actuating member to move said stitching ring along a predetermined path from a position within an axially extending end portion of said fabric radially outwardly and axially inwardly over the drum to lap the fabric over the bead ring including means forming a first pivot for each finger radially inwardly of said bead ring, and means for swinging said fingers radially in unison to move said stitching ring radially outwardly away from said drum and back to said first-mentioned position along a path radially outwardly of said predetermined path including means forming a second pivot for each finger radially outwardly of said first pivot.

5. In a tire building machine having a generally cylindrical expandable drum for receiving a plurality of fabric layers with end portions extending axially beyond the shoulders of the drum, means for radially expanding the drum, and means for positioning bead rings over the fabric end portions adjacent the drum shoulders, improved fabric lapping means for turning the end portions of the fabric layers radially outwardly and axially inwardly over the bead rings and the drum shoulders comprising: a series of circumferentially spaced curved fingers mounted at the end of said drum, an actuating member radially inwardly of the drum shoulders and mounted for movement axially relative to said drum, an expansible and contractible stitching ring, each of said fingers comprising a rigid generally arcuate member pivotally connected at one end to said actuating member and at its opposite end to said stitching ring to hold said ring concentric to said drum, means for moving said actuating member axially, a stop member held against axial movement, means carried by said stop member for swinging said fingers radially substantially in unison in response to axial movement of said actuating member to move said stitching ring along a predetermined path from a position radially inwardly of an axially extending end portion of said fabric radially outwardly and axially inwardly over the drum to lap the fabric over the bead ring, and means carried by said stop member for swinging said fingers radially in unison to move said stitching ring radially outwardly away from said drum and back to said first-mentioned position along a path radially outwardly of said predetermined path.

6. In a tire building machine having a horizontal shaft and a generally cylindrical drum mounted on said shaft, means for supporting an expansible and contractible stitching ring near the shoulder of said drum and for expanding and contracting the ring over the drum including a series of circumferentially spaced generally arcuate turn-over fingers and an actuating member radially inwardly of said drum shoulder mounted on said shaft for axial movements and pivotally connected to the radially inner ends of said fingers, said fingers being connected to said stitching ring at their radially outer ends, a stop member mounted on said shaft axially outwardly of said actuating member and said fingers, said stop member having axially inwardly projecting portions for engaging the axially outer surfaces of said fingers to swing the stitching ring toward said drum in response to movement of said actuating member toward said stop member, and a fulcrum bar between said drum and each finger rigidly connected to said stop member for engaging the axially inner surface of the finger radially outwardly of said projecting portions to swing the stitching ring away from said drum in response to movement of said actuating member away from said stop member.

7. A machine as defined in claim 6 wherein each finger has an elongated slot for receiving a pivot pin carried by said actuating member, said slot having a notch at one end thereof to receive said pivot pin.

8. In a tire building machine having a generally cylindrical drum, an expansible and contractible garter spring, an actuating member mounted for movement axially relative to said drum, a horizontal pivot pin carried by said actuating member, means for supporting said spring and for expanding and moving said spring over the shoulder of said drum including a generally arcuate rigid turn-over finger having a substantially semi-cylindrical portion at its radially outer end for receiving said garter spring and having an elongated slot at its opposite end for receiving said pivot pin, means for supporting said finger in a first position wherein said slot is substantially horizontal and said garter spring is contracted and spaced axially from said drum comprising a fulcrum member axially outwardly of said actuating member and said drum for engaging the axially outer surface of said finger as the slot is moved toward said fulcrum member to swing the upper portion of said finger radially outwardly and axially inwardly toward said drum, said drum resisting radial inward movement of said garter spring as said actuating member approaches said fulcrum member whereby said pivot pin enters the lower portion of said slot when the pin is nearest said fulcrum member.

9. In a tire building machine, an expandable drum mounted on a shaft for rotation about a horizontal axis, said drum having axially spaced rigid annular portions and inflatable pneumatic tubular annuli mounted on said portions, a multiplicity of metal strips extending axially across the outer surfaces of said annuli and defining generally cylindrical outer surfaces covering said annular drum portions, said strips having segmental end portions projecting radially inwardly and annular resilient constraining means biasing said end portions radially inwardly, the inner ends of said strips between said annular portions being spaced apart axially, a series of substantially coaxial arcuate members extending axially from the strips of one annular drum portion to those of the other annular drum portion to form a generally cylindrical surface substantially covering the space between said drum portions, a series of radial guides rigidly mounted between said drum portions, each of said arcuate members being mounted for radial movement on one of said guides, yieldable means including a radial spring for resisting radial outward movement of said arcuate members and for holding said members against the outer surface of said strips, and means for inflating and deflating said pneumatic annuli to expand and contract said drum, said strips and said intermediate members interfitting in the expanded and contracted drum positions to form a regular cylindrical surface covering said drum.

10. In a tire building machine, an expandable drum mounted on a shaft for rotation about a horizontal axis, said drum having axially spaced rigid annular portions and inflatable pneumatic tubular annuli mounted on said portions, a multiplicity of metal strips extending axially across the outer surfaces of said annuli and defining generally cylindrical outer surfaces covering said annular drum portions, said strips having segmental end portions projecting radially inwardly and annular resilient constraining means biasing said end portions radially inwardly, the inner ends of said strips between said annular portions being spaced apart axially, intermediate members extending axially from the strips of one annular drum portion to those of the other annular drum portion to form a generally cylindrical surface covering the space between said drum portions, yieldable means biasing said intermediate members radially inwardly, means for inflating and deflating said pneumatic annuli to expand and contract said drum, said strips and said intermediate members interfitting in the expanded and contracted drum positions to form a regular cylindrical surface covering said drum, a circumferentially continuous elastic sheet covering the outer surfaces of said strips and said intermediate members, and means for preventing axial movement of said strip on said drum.

11. In a tire building machine, an expandable drum mounted on a shaft for rotation about a horizontal axis, said drum having axially spaced rigid annular portions and inflatable pneumatic tubular annuli mounted on said portions, a multiplicity of metal strips extending axially across the outer surfaces of said annuli and defining generally cylindrical outer surfaces covering said annular drum portions, said strips having segmental end portions projecting radially inwardly and annular resilient constraining means biasing said end portions radially inwardly, the inner ends of said strips between said drum portions being spaced apart axially, circumferentially spaced bead-ring-positioning lugs rigidly connected to a plurality of said segmental end portions at opposite ends of said drum and having tapered bead-engaging upper surfaces, intermediate members extending axially between the strips of said annuli to cover the space between said annuli, and means for inflating and deflating said pneumatic annuli to expand and contract said drum and to move said strips and said lugs radially inwardly and outwardly, said strips and said intermediate members interfitting in the expanded and contracted drum positions to form a regular cylindrical surface.

12. An expansible and contractible drum is defined in claim 10 wherein said elastic sheet has opposite end portions that extend radially inwardly at opposite ends of the drum to prevent excessive axial movement of said sheet on the drum.

13. In a tire building machine having an externally cylindrical rotatable drum on which is assembled a pneumatic tire casing including a rubber tread portion and having means for rotating said drum, an improved tread stitching means comprising: a pair of shafts mounted on a carrier parallel to the axis of said drum and spaced different distances from said axis, a plurality of circular rotatable discs mounted in parallel relation on the shaft nearest said axis and having internal circular openings with a diameter greater than that of said shaft so that the discs may rotate and may move a limited amount radially on said shaft, said discs decreasing in external diameter near the center of said shaft so as to conform substantially to the shape of said tread, and an elastic rubber sleeve mounted on the shaft farthest from said axis to form a freely rotatable back-up roll that increases in diameter near the center of said shaft so as to conform substantially to the shape of said tread, and means for pressing said carrier toward said drum.

14. In a tire building machine having an externally cylindrical rotatable drum on which is assembled a pneumatic tire casing including a rubber tread portion and having means for rotating said drum, an improved tread stitching means comprising: a pair of shafts mounted on a carrier parallel to the axis of said drum and spaced different distances from said axis, a plurality of flat rotatable circular discs mounted in parallel relation on the shaft nearest said axis and having internal circular openings with a diameter greater than that of said shaft so that the discs may rotate and may move independently a limited amount radially on said shaft, resilient means for causing the discs to conform to the shape of said tread portion including a generally cylindrical deformable elastic rubber annulus mounted on the shaft farthest from said axis to form a freely rotatable back-up roll for pressing against all of said discs, and motor means for moving said carrier toward said drum and for moving the discs against the tire casing on said drum during rotation of said drum whereby the discs are rotated by said drum.

15. A tread stitching means as defined in claim 14 wherein a plane through the axis of said shafts is inclined in the neighborhood of about 5 to 25 degrees relative to a plane through the axis of the drum and the nearest shaft when said discs engage a tire casing on said drum.

16. A tread stitching means as defined in claim 14 wherein the shaft farthest from said drum is adjustably mounted for angular swinging movements and means is provided for holding said shaft in adjusted positions.

17. In a tire building machine having a cantilever shaft, a generally cylindrical expandable drum mounted on said shaft for receiving a plurality of fabric layers with end portions arranged in staggered relation and extending axially beyond the shoulders of the drum, means for radially expanding the drum, and means carried by said shaft for positioning inextensible bead rings over the fabric end portions adjacent the drum shoulders, improved fabric lapping means for turning the end portions of the fabric layers radially outwardly and axially inwardly over the bead rings comprising: a series of regularly circumferentially spaced curved turn-over fingers mounted at each end of said drum, each of said fingers having an elongated slot at its radially inner end, stop members mounted on said shaft near opposite ends of said drum and held against axial movement relative to said drum, actuating members mounted on said shaft within said drum for movement axially toward and away from said stop members and having horizontal pivot pins thereon that fit in the slots of said fingers, actuating means within said shaft for moving said actuating members axially to move said pins along lines parallel to the axis of said shaft toward and away from said stop members, an expansible and contractible stitching ring connected to the radially outer ends of the turn-over fingers near each end of said drum to resist radial outward movement of said outer ends, each of said stop members having an axially inwardly projecting fulcrum portion substantially adjacent the line of movement of the pivot pin in each turn-over finger for engaging that finger to limit axial and vertical swinging movement thereof away from said drum, the fingers being shaped so as to move each stitching ring from a position below an axially extending end portion of said fabric radially outwardly and axially inwardly over the drum and into engagement with the fabric on the drum to lap the fabric over the bead rings as the pivot pins of the actuating members are moved axially outwardly toward said stop members and as the fingers move over and swing about said fulcrum portions, said pivot pins engaging the outer ends of the slots in said fingers during movement of the stitching rings toward said drum to cause each slot to move from a generally axial toward a generally radial position, said stitching rings engaging the lapped end portions of the fabric and being held against radial inward movement by the drum before the pivot pins reach their axially outermost positions so that the inner ends of said fingers move radially inwardly relative to said pivot pins and said pins approach the outer ends of said slots, and means for moving said stitching rings away from said drum and out of engagement with said fabric.

18. Fabric lapping means as defined in claim 17 wherein a fulcrum bar is provided between each finger and the drum radially outwardly of said fulcrum portions and means is provided for holding the pivot pins near the outer ends of said slots as the pivot pins are moved axially inwardly including notches at the outer ends of the slots, movement of said actuating members and said pivot pins axially inwardly from their axially outer positions moving the pins into said notches and then moving the fingers against said fulcrum bars to swing the fingers radially and to expand the stitching ring out of contact with the fabric on the drum, the pins moving out of said notches toward the inner ends of said slots as the actuating members continue movement axially inwardly.

19. In a tire building machine having a cantilever shaft, a generally cylindrical expandable drum mounted on said shaft for receiving a plurality of fabric layers with end portions arranged in staggered relation and extending axially beyond the shoulders of the drum, means for expanding the drum radially and means carried by said shaft for positioning inextensible bead rings over the fabric end portions adjacent the drum shoulders, improved fabric lapping means for turning the end portions of the fabric layers radially outwardly and axially inwardly over the bead rings comprising: a series of regularly circumferentially spaced curved turn-over fingers mounted at each end of said drum, each of said fingers having an elongated slot at its radially inner end, stop members mounted on said shaft near opposite ends of said drum and held against axial movement relative to said drum, actuating members mounted on said shaft within said drum for movement axially toward and away from said stop members and having horizontal pivot pins thereon that fit in the slots of said fingers, actuating means within said shaft for moving said actuating members axially to move said pins along lines parallel to the axis of said shaft toward and away from said stop members, an expansible and contractible stitching ring connected to the radially outer ends of the turn-over fingers near each end of said drum to resist radial outward movement of said outer ends, each of said stop members having an axially inwardly projecting fulcrum portion substantially adjacent the line of movement of the pivot pin in each turn-over finger for slidably engaging that finger to limit axial and vertical swinging movement thereof away from said drum, the fingers being shaped so as to move each stitching ring from a position below an axially extending end portion of said fabric radially outwardly and axially inwardly over the drum and into engagement with the fabric on the drum to lap the fabric over the bead rings as the pivot pins of the actuating members are moved axially outwardly toward said stop members and as the fingers swing about said fulcrum portions, said pivot pins engaging the outer ends of the slots in said fingers during movement of the stitching rings toward said drum to cause each slot to move from a generally axial toward a generally radial position, said stitching rings engaging the lapped end portions of the fabric and being held against radial inward movement by the drum before the pivot pins reach their axially outermost positions so that the inner ends of said fingers move radially inwardly relative to said pivot pins and said pins approach the outer ends of said slots, means for moving said stitching rings away from said drum and out of engagement with said fabric, a fulcrum member between each finger and the drum radially outwardly of said fulcrum portions, and means for holding the pivot pins at the outer ends of said slots as the pivot pins are moved axially inwardly.

20. In a tire building machine having an externally cylindrical rotatable drum on which is assembled a pneumatic tire casing including a rubber tread portion and means for rotating said drum, an improved tread stitching means comprising: a shaft mounted on a carrier parallel to the axis of said drum and spaced from said axis, a plurality of circular discs mounted in parallel relation on the shaft and having internal circular openings with a diameter greater than that of said shaft so that the discs may move a limited amount radially on said shaft, an elastic rubber back-up roll of circular cross-section mounted for rotation on said carrier and having an annular portion engaging said discs and causing said discs to conform to the shape of said tread, and means for pressing said carrier toward said drum.

21. A method of building a tire comprising placing a plurality of rubber-coated fabric strips on an expandable cylindrical drum with the cords of each strip inclined with respect to the cords of the next adjacent strip and with the edges of the strips arranged in staggered relation to form a fabric layer having end portions that decrease in thickness toward their outer ends and that extend beyond the ends of the drum, expanding the drum to expand the fabric layer between said end portions, moving inextensible bead rings over said end portions toward said drum and into engagement with the fabric adjacent the shoulders of the drum to adhere the bead rings to the fabric, placing a resilient stitching ring within each of said end portions and expanding and moving said ring along a first predetermined path over the shoulders of the drum while holding the ring concentric to the drum so as to lift the end portion and to lap said end portion over the bead ring, contracting the stitching ring during axial inward movement of the ring to press the fabric against the drum, and expanding and moving the stitching ring along a second predetermined path radially outwardly of said first path to move the stitching ring out of contact with said fabric and beyond the ends of said drum.

22. A tread stitching means as defined in claim 14 wherein an annular elastic rubber sheet of substantially uniform thickness is mounted on said discs and grips said discs throughout their circumference, said sheet covering said discs and engaging said back-up roll and said tire casing when said carrier is pressed toward said drum.

23. In a tire building machine having a frame, a cantilever shaft mounted for rotation on said frame, a generally cylindrical expansible and contractible drum mounted on said shaft for receiving a plurality of fabric layers with end portions extending axially beyond the shoulders of the drum, means for radially expanding the drum, and means carried by the frame for positioning the bead rings over the fabric end portions and for pressing the bead rings against the fabric end portions, improved fabric lapping means for turning the end portions of the fabric layers radially outwardly and axially inwardly over the bead rings and the ends of the drum comprising: an expansible and contractible resilient annular stitching ring near each shoulder of said drum and means for supporting said ring and for expanding and contracting the ring over the drum including a series of regularly circumferentially spaced turn-over fingers, an actuating member mounted on said cantilever shaft within said drum for axial movement on said shaft, and a stop member mounted on said shaft and held against axial movement on said shaft, each of said fingers comprising a rigid generally arcuate member extending radially outwardly between said stop member and said drum from said actuating member to said stitching ring and curved inwardly toward said drum, means pivotally connecting the inner end of each turn-over finger to the actuating member and the outer end of each finger to the stitching ring, said fingers holding the stitching ring concentric to said drum at all times, said stop member having axially inwardly projecting portions providing fulcrums for engaging the axially outer surfaces of said fingers to swing the fingers radially substantially in unison in response to axial movement of said actuating member to move the stitching ring along a predetermined path from a position radially inwardly of an axially extending end portion of said fabric radially outwardly and axially inwardly over the drum to lap the fabric over the bead ring.

24. In a tire building machine having a generally cylindrical expandable drum for receiving a plurality of fabric layers with end portions extending axially beyond the shoulders of the drum, means for radially expanding the drum, and means for positioning bead rings against the fabric end portions adjacent the drum shoulders, improved fabric lapping means for turning the end portions of the fabric layers radially outwardly and axially inwardly over the bead rings and the ends of the drum comprising: a series of circumferentially spaced radially extending curved fingers mounted at one end of said drum, an actuating member radially inwardly of the drum shoulders and mounted for movement axially relative to said drum, an expandable resilient constraining annulus, each of said fingers being pivotally connected at one end of said actuating member and being connected at its opposite end to said annulus, means for swinging said fingers radially outwardly substantially in unison in response to axial movement of said actuating member to move said resilient annulus from a first position within an axially extending end portion of said fabric to a second position radially outwardly of said drum including means for engaging the axially outer face of each finger to provide a first pivot radially inwardly of said drum shoulders, and means forming a generally cylindrical fabric-engaging surface for supportnig the fabric end portions axially outwardly of said constraining annulus when said annulus is in said first position, each of said fingers comprising a rigid generally arcuate member extending radially outwardly from the actuating member to the resilient annulus and curved inwardly toward said drum.

References Cited in the file of this patent
UNITED STATES PATENTS

| | | |
|---|---|---|
| 2,182,176 | Maranville | Dec. 5, 1939 |
| 2,600,291 | Engler | June 10, 1952 |
| 2,614,951 | Iredell | Oct. 21, 1952 |
| 2,614,952 | Kraft | Oct. 21, 1952 |
| 2,669,281 | Breth | Feb. 16, 1954 |